(12) United States Patent
Coyle et al.

(10) Patent No.: US 10,648,065 B2
(45) Date of Patent: May 12, 2020

(54) SYSTEMS AND METHODS FOR MANUFACTURING PREPREG TAPES

(71) Applicant: General Electric Company, Schenectady, NY (US)

(72) Inventors: Dennis Joseph Coyle, Clifton Park, NY (US); Henry Charles McGuigan, Duanesburg, NY (US); Krishnan Balaji Thattai Parthasarathy, Clifton Park, NY (US); Matthew Hockemeyer, Albany, NY (US); Daniel Gene Dunn, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 159 days.

(21) Appl. No.: 15/829,484

(22) Filed: Dec. 1, 2017

(65) Prior Publication Data

US 2019/0169724 A1  Jun. 6, 2019

(51) Int. Cl.
  *C22C 47/06*   (2006.01)
  *C22C 47/14*   (2006.01)
  (Continued)

(52) U.S. Cl.
  CPC .............. *C22C 47/064* (2013.01); *B28B 1/42* (2013.01); *B29B 15/12* (2013.01); *B29C 70/443* (2013.01); *B29C 70/543* (2013.01); *B32B 18/00* (2013.01); *C08J 5/10* (2013.01); *C08J 5/24* (2013.01); *C22C 47/14* (2013.01); *B28B 1/40* (2013.01);
  (Continued)

(58) Field of Classification Search
  CPC ... C22C 47/064; C22C 47/14; C04B 2237/38; C04B 2235/5268; C04B 35/62868; C04B 35/62894; C04B 2235/6025; C04B 2235/6028; C04B 2235/616; B29C 70/443; B29C 70/543; B29C 37/0075; C08J 5/24; C08J 5/10; B28B 23/0006; B28B 1/40; B28B 1/42; B29B 15/12; B32B 18/00
  See application file for complete search history.

(56) References Cited

U.S. PATENT DOCUMENTS

| 3,645,829 | A | 2/1972 | Palfreyman et al. |
| 5,098,510 | A | 3/1992 | Krummenacher |

(Continued)

FOREIGN PATENT DOCUMENTS

WO   WO2016099829 A1   6/2016

OTHER PUBLICATIONS

Paul et al., "Effects of Fiber/Matrix Interactions on the Properties of Graphite/Epoxy Composites", Defence Technical Information Center, pp. 167, Sep. 1982.

*Primary Examiner* — Vishal I Patel
(74) *Attorney, Agent, or Firm* — Paul DiConza

(57) ABSTRACT

Systems and methods for manufacturing unidirectional fiber prepreg tapes for CMC articles are provided. In one exemplary aspect, the method includes casting a matrix material on a carrier film to form a matrix film. The matrix material of the matrix film is then allowed to dry for a predetermined time. The matrix film is then wrapped on a drum and the matrix material is wet to a predetermined viscosity with a solvent. Thereafter, a fiber tow that includes of a plurality of fibers is wound about the drum so that the fiber tow penetrates into the matrix material and the matrix material impregnates the fiber tow to form the prepreg tape.

18 Claims, 13 Drawing Sheets

(51) Int. Cl.
*B29C 70/44* (2006.01)
*B29C 70/54* (2006.01)
*C08J 5/24* (2006.01)
*C08J 5/10* (2006.01)
*B32B 18/00* (2006.01)
*B29B 15/12* (2006.01)
*B28B 1/42* (2006.01)
*B28B 23/00* (2006.01)
*B29C 37/00* (2006.01)
*C04B 35/628* (2006.01)
*B28B 1/40* (2006.01)

(52) U.S. Cl.
CPC ....... *B28B 23/0006* (2013.01); *B29C 37/0075* (2013.01); *C04B 35/62868* (2013.01); *C04B 35/62871* (2013.01); *C04B 35/62894* (2013.01); *C04B 2235/5268* (2013.01); *C04B 2235/6025* (2013.01); *C04B 2235/6028* (2013.01); *C04B 2235/616* (2013.01); *C04B 2237/38* (2013.01)

(56) References Cited

U.S. PATENT DOCUMENTS

| | | |
|---|---|---|
| 5,579,532 A | 11/1996 | Edd |
| 6,355,338 B1 | 3/2002 | Hilmas et al. |
| 6,858,177 B2 | 2/2005 | Kono et al. |
| 9,610,756 B2 | 4/2017 | Ashton et al. |
| 2007/0096371 A1 | 5/2007 | McGuigan et al. |
| 2010/0075144 A1* | 3/2010 | Davies ................ C08J 5/04 428/375 |
| 2014/0174632 A1* | 6/2014 | Roman ................ C08J 5/24 156/87 |
| 2017/0144925 A1* | 5/2017 | Dunn ................ C03C 17/001 |

* cited by examiner

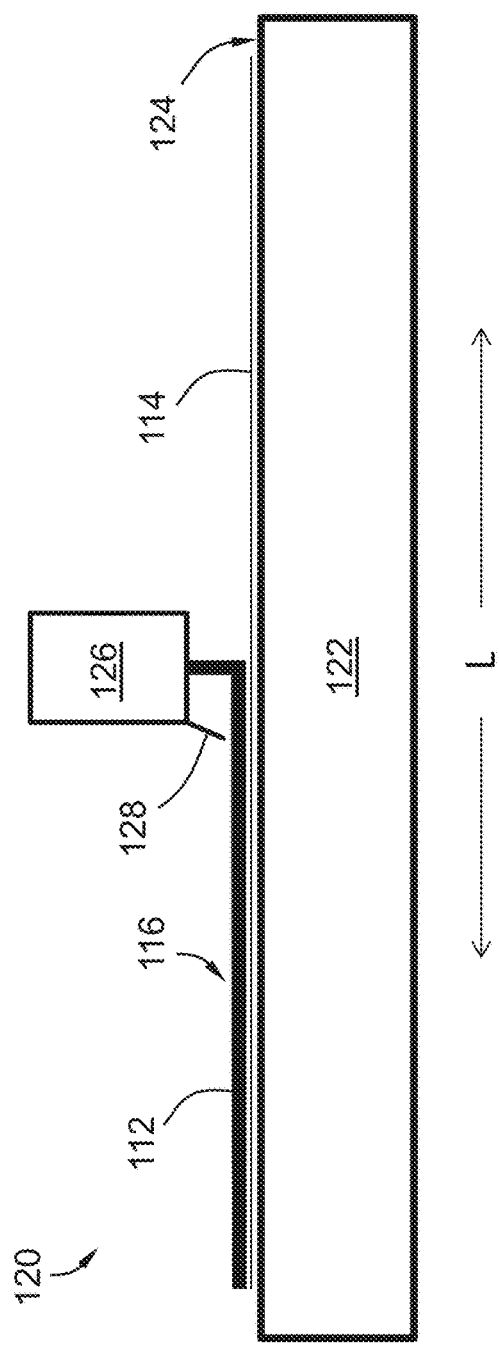
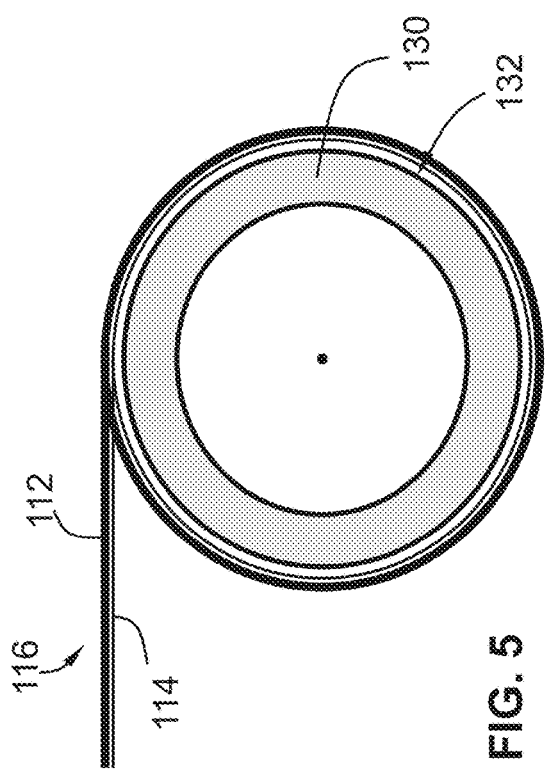

EXAMPLE 1

420

EXAMPLE 2

422

EXAMPLE 2

430

EXAMPLE 3

432

EXAMPLE 3

SYSTEMS AND METHODS FOR MANUFACTURING PREPREG TAPES

GOVERNMENT SUPPORT CLAUSE

This invention was made with government support under FA8650-04-G-2466-003 awarded by the Department of Defense. The government has certain rights in the invention.

FIELD

The present subject matter relates generally to systems and methods for manufacturing ceramic matrix composite (CMC) articles. More particularly, the present subject matter relates to systems and methods for making unidirectional fiber prepreg tapes for CMC articles.

BACKGROUND

Non-traditional high temperature materials, such as ceramic matrix composite (CMC) materials, are more commonly being used for various components within gas turbine engines. As CMC materials can withstand relatively extreme temperatures and pressures, there is particular interest in replacing components formed of traditional materials within the flow path of gas turbine engines with CMC materials. CMC materials, particularly continuous fiber ceramic composite (CFCC) materials, are currently being utilized for shrouds, combustor liners, nozzles, and other high-temperature components of gas turbine engines. Of particular interest to high-temperature applications are silicon-based composites, such as silicon carbide (SiC) as the matrix and/or reinforcement material.

CMC materials generally comprise a fibrous or filamentary reinforcement material embedded within a ceramic matrix material. The reinforcement material serves as the load-bearing constituent, while the ceramic matrix protects the reinforcement material, maintains fiber orientation, and serves to dissipate loads to the reinforcement material. CMC articles are frequently fabricated from multiple layers of "prepreg" or "pregreg tapes" that are typically tape-like structures that include a reinforcement material impregnated with a slurry that contains a precursor and/or powder of the matrix material and one or more organic binders. The prepreg tape undergoes processing (including firing) to convert the precursor or powder to the desired ceramic. Prepregs for CFCC materials frequently include a two-dimensional fiber array comprising a single layer of unidirectionally aligned tows (bundles of individual fiber filaments) impregnated with a matrix precursor or powder to create a generally two-dimensional laminate. Multiple plies of the resulting prepregs are then stacked and debulked to form a laminate preform, a process referred to as "layup." The prepregs are typically but not necessarily arranged so that tows of adjacent prepregs are oriented transverse (e.g., perpendicular) to each other, providing greater strength in the laminar plane of the preform (corresponding to the principal load bearing directions of the final CMC component).

Following layup, the laminate preform typically undergoes debulking and curing while subjected to applied pressure and an elevated temperature, such as in an autoclave. In the case of melt-infiltrated (MI) CMC articles, the debulked and cured preform undergoes additional processing. First, the preform is heated in vacuum or in an inert atmosphere in order to decompose the organic binders, at least one of which pyrolyzes during this heat treatment to form a carbon char, and produces a porous preform for melt infiltration. Further heating, either as part of the same heat cycle as the binder burn-out step or in an independent subsequent heating step, the preform is melt infiltrated, such as with molten silicon supplied externally. The molten silicon infiltrates into the porosity, reacts with the carbon constituent of the matrix to form silicon carbide, and fills the porosity to yield the desired CMC component.

Conventional methods for making MI-CMC prepreg tapes have included the use of a wet drum winding technique. Typically, a wet drum winding processes entails pulling a fiber tow through a bath containing a slurry mixture that includes suitable matrix precursor or powder materials, organic binders, and solvents, and then winding the resulting wet, precursor/powder-impregnated tow around a drum. Before contacting the drum, the wet, precursor/powder-impregnated tow is preferably pulled through an orifice to control the amount of slurry picked up by the tow in the slurry bath. By indexing the drum (and/or the bath and orifice), the tow is laid down at a constant pitch so that each tow winding touches but does not completely overlap the tow winding from the previous drum revolution, yielding a continuous, unidirectional prepreg tape. Prior to being wound with the tow, the drum is preferably wrapped with a release sheet or carrier sheet, such as a film formed of TEFLON® (polytetrafluoroethylene, or PTFE), so that the resulting prepreg tape can be more easily removed from the drum. The release sheet also acts as a carrier to support the prepreg tape during subsequent handling and cutting. While on the drum, the prepreg tape is typically allowed to air dry by allowing the solvents to evaporate. Alternatively, the tape may be cut from the drum, laid flat, and allowed to air dry.

Prepreg tapes produced by such conventional wet drum winding processes typically have a surface roughness, or waviness, corresponding to the pitch of the fiber tow on the drum. There is also typically variability in the distribution of fiber and matrix across the tape because of the tow pitch. Furthermore, because the tow is under tension during the winding process, the tow tends to be pulled down onto the drum surface, yielding a prepreg tape that has proportionally more tow at the surface of the tape contacting the drum and proportionally more matrix precursor or powder at the surface of the tape facing away from the drum.

Furthermore, prepreg tapes made by such conventional wet drum winding processes can also suffer from a significant amount of broken tow fibers and loosely adhering fibers (i.e., "fuzz") that can break off and cause blockage of the orifice. When blockage occurs, the amount of slurry remaining on the tow downstream of the orifice is diminished, leading to a region on the resulting prepreg tape with lower than optimum matrix content. In severe cases, the blockage of the orifice can continue to accumulate broken fibers from the tow until it eventually causes the tow to break. In order to prevent such problems from blockage, the orifice is typically sufficiently sized to allow a majority of tow, even those with moderate amounts of damaged fiber and adhering loose fiber, to readily pass. Consequently, the amount of matrix picked up by the tow may be higher than would be optimum, thus leading to lower than desired fiber volume fraction in the finished composite. Even with the use of a large orifice, orifice blockage can still occur. Thus, drum winding operations require constant operator supervision so that such blockages can be removed as they occur.

Another complication of conventional drum winding processes is that the tow must be completely impregnated (i.e., wet out) with slurry during the winding process, which requires that the tow spend a sufficient amount of time submersed in the slurry to allow for complete wet out. This submersion time, which can be about five seconds for certain processes, places a limit on the speed with which the tow can be drawn through the slurry bath.

Other known methods for forming CMC prepreg tapes include dry winding processes. In such processes, a release sheet having an adhesive film is first applied to a drum. Then, a dry fiber tow (i.e., a fiber tow that has not been pulled through a bath containing a slurry mixture) is wound on the drum so that the fibers of the tow adhere to the adhesive film of the release sheet to form a filamentary mat. Then, a slurry mixture that includes suitable matrix precursor or powder materials, organic binders, and solvents is casted into the filamentary mat to yield a prepreg tape. Despite the benefits of removing some of the steps of conventional wet drum processes, such dry winding techniques similarly present a number of challenges. For instance, casting the matrix material onto the filamentary mat while the mat is still on the drum is particularly challenging and results in less than optimal impregnation. Removing the filamentary mat is also undesirable as handling of the filamentary mat is less than ideal, as the fiber filaments are prone to move about as they are only bound with the adhesive film of the release layer. Moreover, when casting the slurry mixture into the filamentary mat, the force to push or engulf the filaments with the slurry matrix is generally insufficient. As such, many times the slurry matrix is not dispersed between all of the filaments of the tow, leading to less than optimal mechanical properties of the final composite article.

Accordingly, improved systems and methods that address one or more of the challenges noted above would be useful.

BRIEF DESCRIPTION

Aspects and advantages of the invention will be set forth in part in the following description, or may be obvious from the description, or may be learned through practice of the invention.

In one exemplary aspect, the present disclosure is directed to a method for manufacturing a prepreg tape. The method includes winding a fiber tow comprised of a plurality of fibers about a drum so that the fiber tow penetrates into a matrix material of a matrix film disposed on the drum and so that the matrix material impregnates the fiber tow to form the prepreg tape. During winding, the matrix material has a predetermined viscosity.

In another exemplary aspect, the present disclosure is directed to a system for manufacturing a prepreg tape. The system includes a casting system for casting a matrix material on a carrier film to form a matrix film. Moreover, the system includes a winding system. The winding system includes a drum rotatable about an axis and operatively configured to be wrapped with the matrix film. The winding system also includes a wetting apparatus for wetting the matrix material of the matrix film such that the material has a predetermined viscosity. Further, the winding system includes a reinforcement drum for supplying a fiber tow comprised of a plurality of fibers to the drum, and wherein, when the fiber tow is supplied to the drum, the fiber tow is wound about the drum so that the fiber tow penetrates into the matrix material of the matrix film wrapped on the drum and the matrix material impregnates the fiber tow to form the prepreg tape.

In another exemplary aspect, the present disclosure is directed to a method for manufacturing a prepreg tape. The method includes casting a matrix material on a carrier film to form a matrix film. The method also includes drying the matrix material of the matrix film for a predetermined time. Further, the method includes wetting the matrix material of the matrix film to a predetermined viscosity with a solvent. In addition, the method includes winding a fiber tow comprised of a plurality of fibers about the drum so that the fiber tow penetrates into the matrix material and the matrix material impregnates the fiber tow to form the prepreg tape. The method also includes drying the prepreg tape for a predetermined time. Moreover, the method includes covering the prepreg tape with a cover film to form a prepreg laminate. The method also includes compacting the prepreg laminate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 4 provides a schematic view of an exemplary casting system depicting a matrix material being cast on a carrier film to form a matrix film according to exemplary embodiments of the present disclosure;

FIG. 5 provides a schematic view of the matrix film being wrapped on a drum according to exemplary embodiments of the present disclosure;

Figure 1:
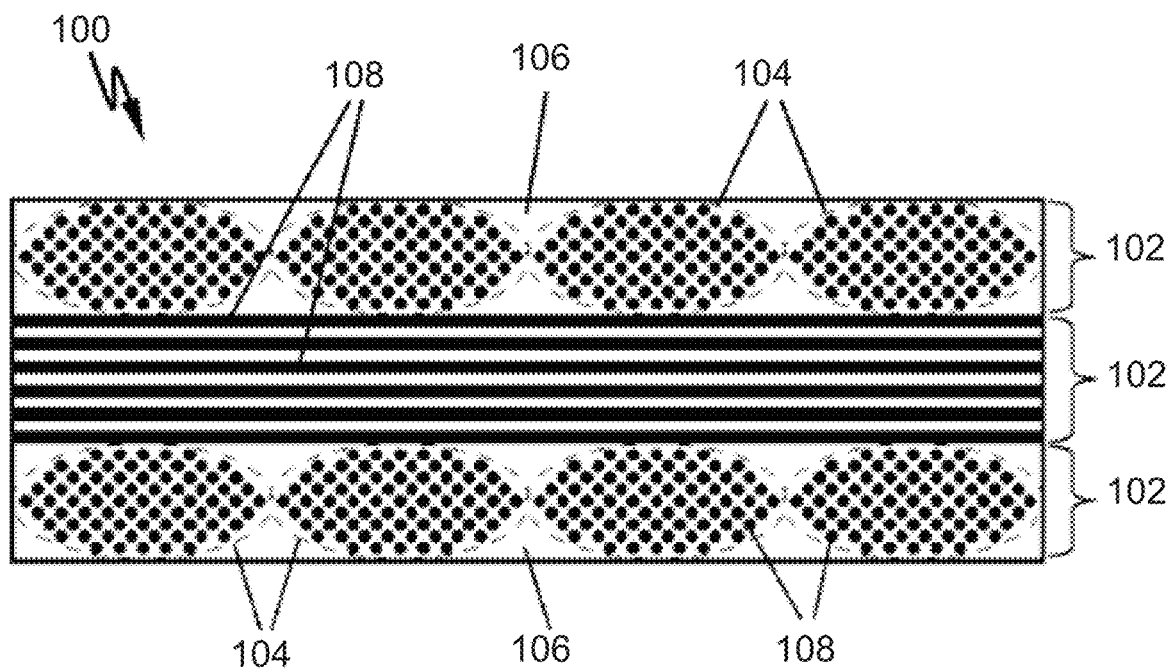
FIG. 1 provides a schematic cross-sectional view of an exemplary CMC article according to exemplary embodiments of the present disclosure.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows. Furthermore, as used herein, terms of approximation, such as "approximately," "substantially," or "about," refer to being within a five percent (5%) margin of error.

Exemplary aspects of the present disclosure are directed to systems and methods for manufacturing unidirectional fiber prepreg tapes for CMC articles. In one exemplary aspect, a method for manufacturing a prepreg tape is provided. The exemplary method includes casting a matrix material having a slurry composition on a carrier film to form a matrix film. The casted matrix material of the matrix film is then allowed to dry for a predetermined time, allowing the matrix material to transition from a slurry composition to a more solid state. After allowing the matrix material to dry, the matrix film is wrapped on a drum. Then, the matrix material is wet to a predetermined viscosity with a solvent. Wetting the matrix material with the solvent softens the matrix material. After the matrix material is wet, a fiber tow that includes of a plurality of fibers is wound about the drum so that the fiber tow penetrates into the matrix material and the matrix material impregnates between the fibers of the fiber tow to form the prepreg tape. By winding the fiber tow about the drum and into the matrix material, the resultant prepreg tape may have improved matrix distribution across its thickness, uniform fiber spacing, and improved impregnation of the fiber tow.

FIG. 1 provides a cross-sectional view of an exemplary CFCC CMC article 100 according to exemplary embodiments of the present disclosure. As shown in FIG. 1, CMC article 100 has a laminate construction formed of multiple layers or lamina 102. Each lamina 102 includes a reinforcement material encased within a matrix. More particularly, for this embodiment, each lamina 102 includes one or more fiber tows 104 encased within a ceramic matrix 106, which is formed, wholly or in part, by conversion of a ceramic matrix precursor or powder and binders, e.g., during firing and melt infiltration cycles. Each fiber tow 104 includes a plurality of fibers 108 that serve as the reinforcement material of CMC article 100. As CMC article 100 is a CFCC article, the fiber tows 104 are unidirectional in each lamina 102, i.e., oriented side-by-side and parallel to each other. Suitable tow diameters and center-to-center tow spacing will depend on the particular application, the thicknesses of the lamina 102, as well as other factors, and therefore are not represented to scale in FIG. 1.

CMC article 100 can be formed of various suitable materials. For instance, the matrix 106 can be formed of silicon carbide, silicon, silica, alumina, combinations thereof, or other suitable materials. The fibers 108 can be ceramic fibers, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). As one example, CMC article 100 can be formed of a silicon carbide/silicon carbide (SiC/SiC) reinforcement/matrix material. Moreover, in some embodiments, the plurality of fibers 108 are coated with one or more coatings, such as e.g., a silicon-doped boron nitride coating (B(Si)N) and/or a boron nitride (BN) coating. Coating the fibers 108 can provide advantageous mechanical properties of the CMC article 100, among other benefits.

In some embodiments, one or more lamina 102 of the CMC article 100 are derived from the prepreg tapes. To construct the CMC article 100, a number of prepreg tapes are formed and then laid up to form a preform (not shown). After laying up the prepreg tapes to form the preform, the preform undergoes further processing to yield CMC article 100. For instance, the preform may undergo one or more debulking, firing, and/or melt infiltration cycles to cure the preform. The preform may then be finish machined as needed to form the CMC article 100 to the desired geometry.

Figure 2:
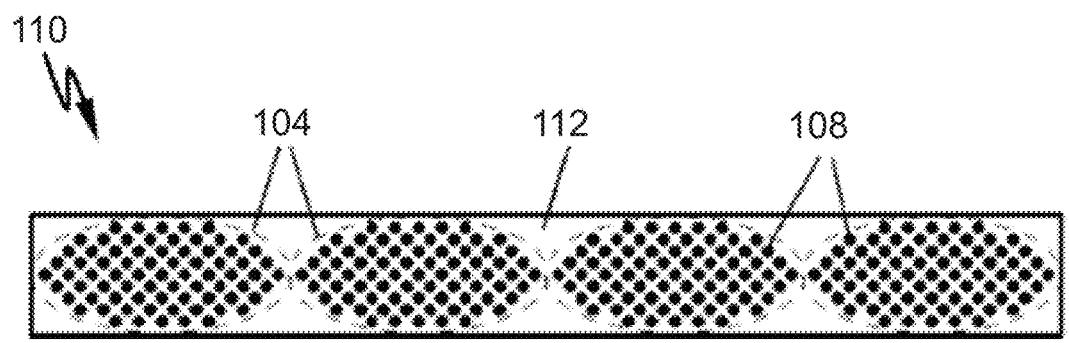
FIG. 2 provides a schematic cross-sectional view of an exemplary prepreg tape according to exemplary embodiments of the present disclosure.

FIG. 2 provides a cross-sectional view of an exemplary prepreg tape 110 according to exemplary embodiments of the present disclosure. As shown, prepreg tape 110 includes fibers 108 bundled in fiber tows 104 embedded within a matrix material 112. In the depicted embodiment of FIG. 2, matrix material 112 is in a solid form. When cured, the solid matrix material 112 forms the ceramic matrix 106 of one of the lamina 102 of the CMC article 100 (FIG. 1). The solid matrix material 112 can be formed by, among other things, one or more organic binders and one or more ceramic precursors or powders. Various binders and precursors/powders can be used to form matrix material 112. Exemplary methods and systems for manufacturing prepreg tapes 110 are provided below.

Figure 3:
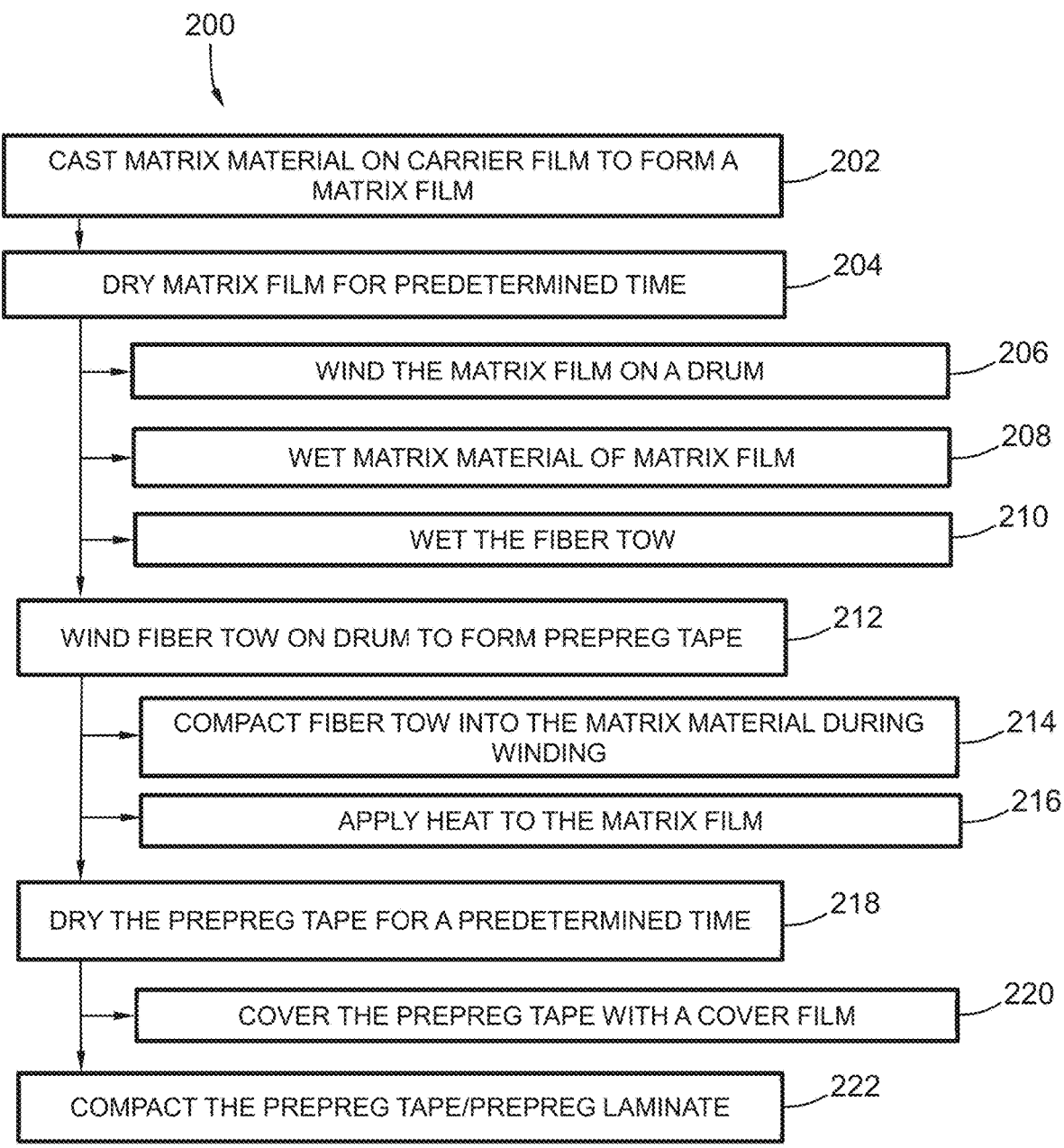
FIG. 3 provides a flow diagram of an exemplary method according to exemplary embodiments of the present disclosure.
Figure 6:
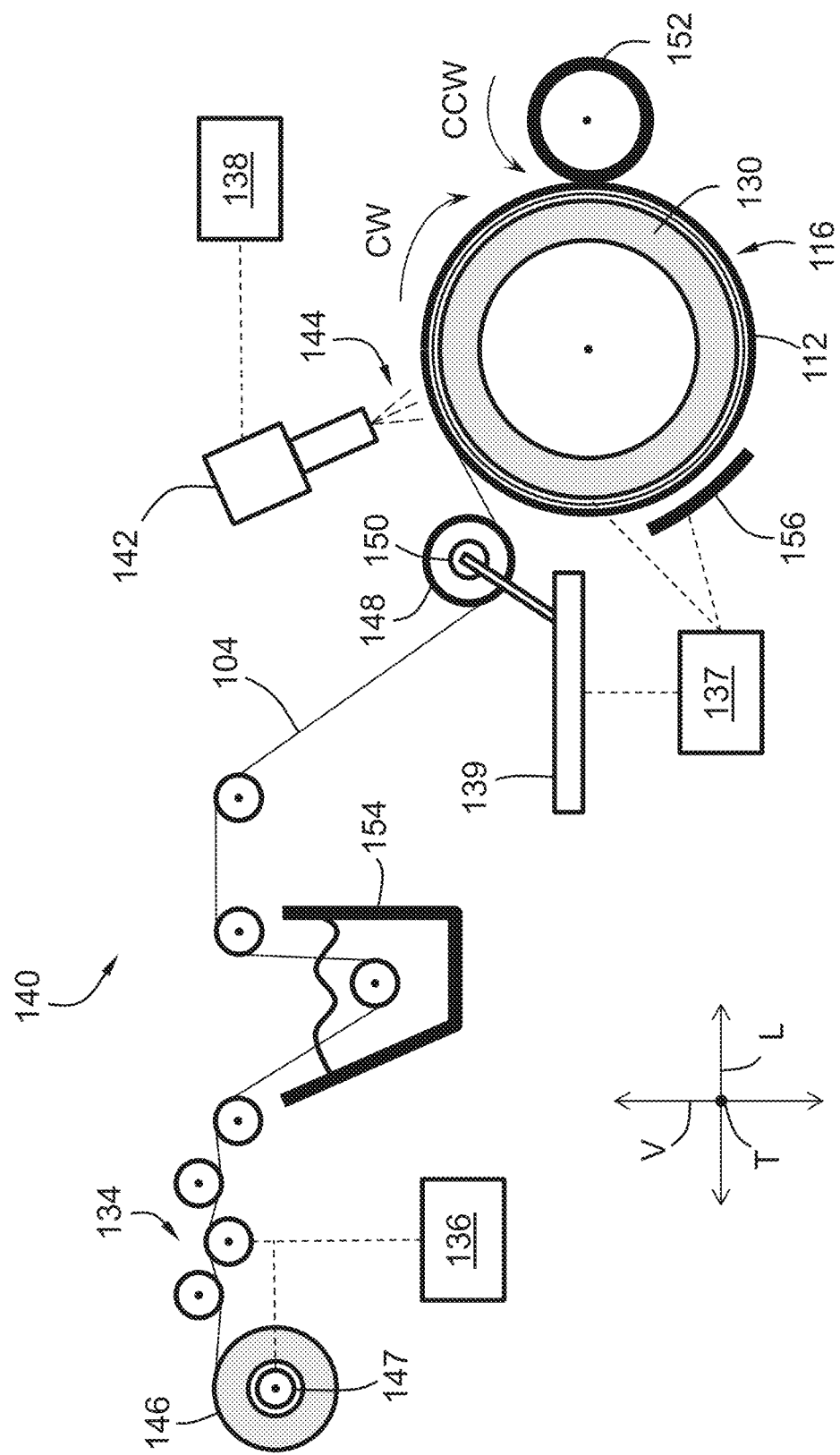
FIG. 6 provides a schematic view of an exemplary winding system according to exemplary embodiments of the present disclosure.
Figure 7:
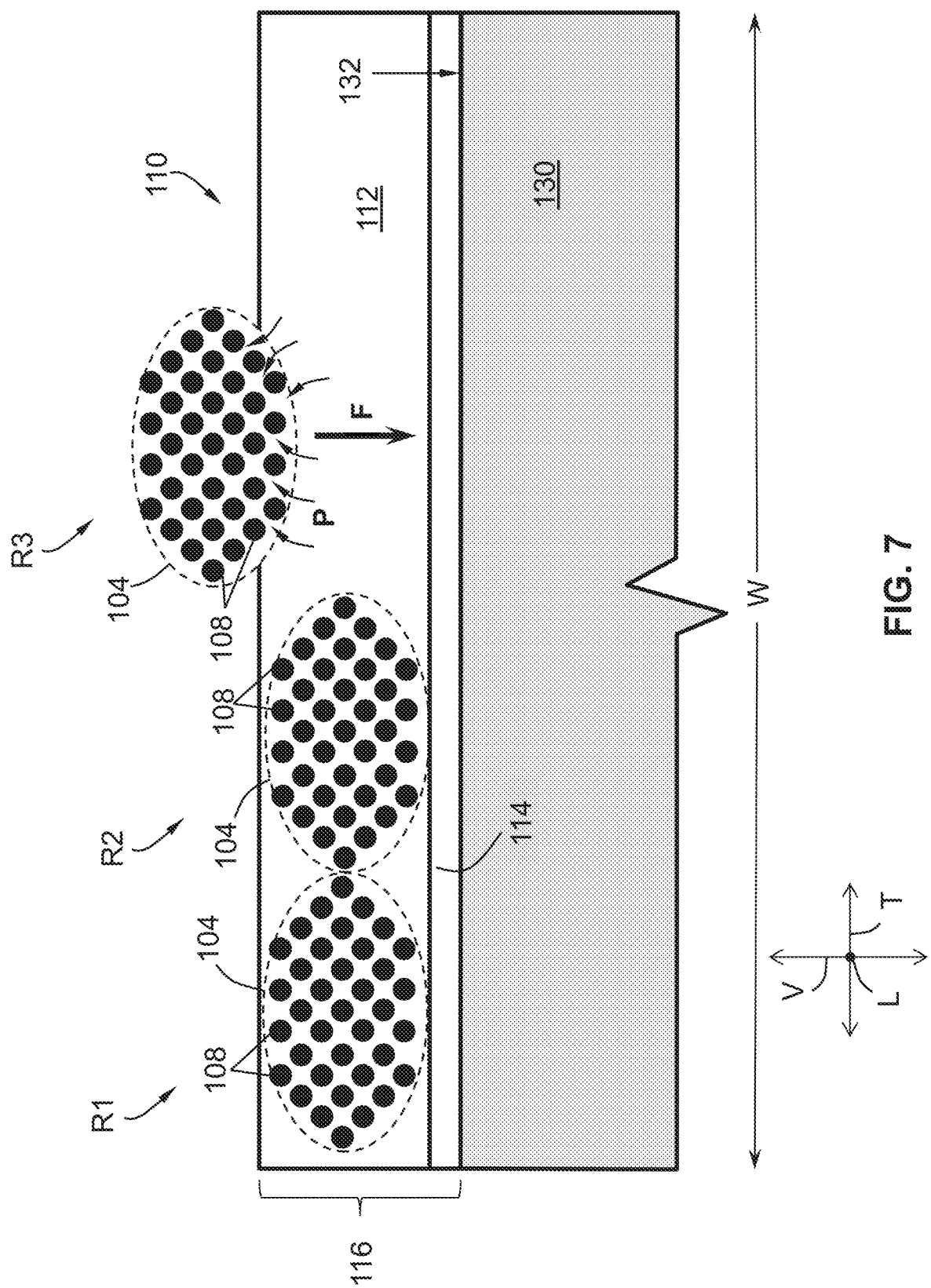
FIG. 7 provides a schematic cross-sectional view of a fiber tow penetrating into the matrix material of the matrix film.
Figure 8:
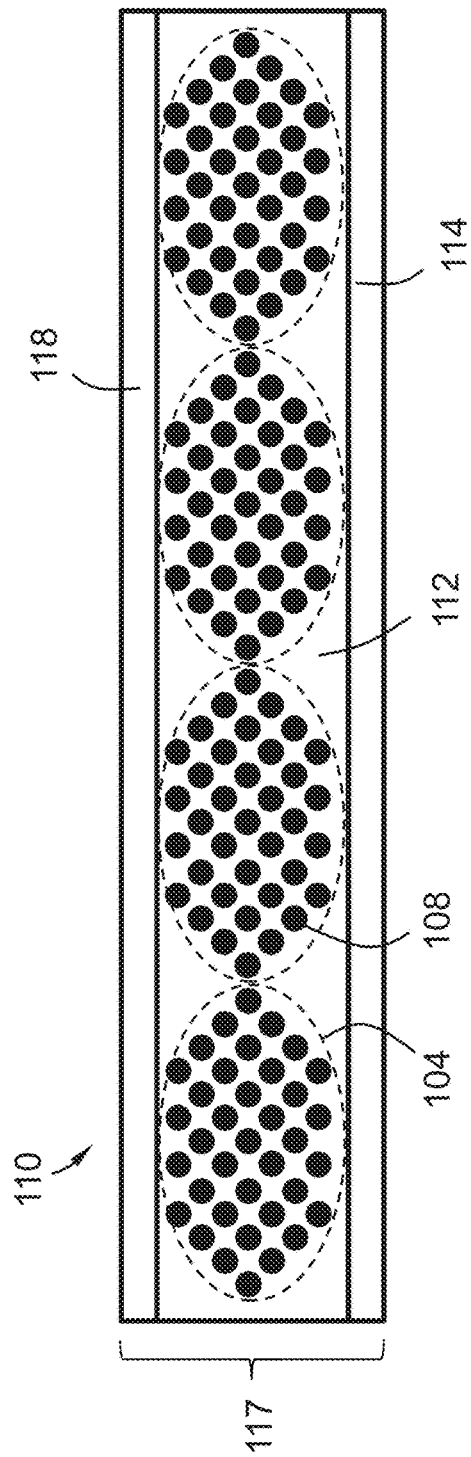
FIG. 8 provides a schematic cross-sectional view of a prepreg laminate according to exemplary embodiments of the present disclosure.
Figure 9:
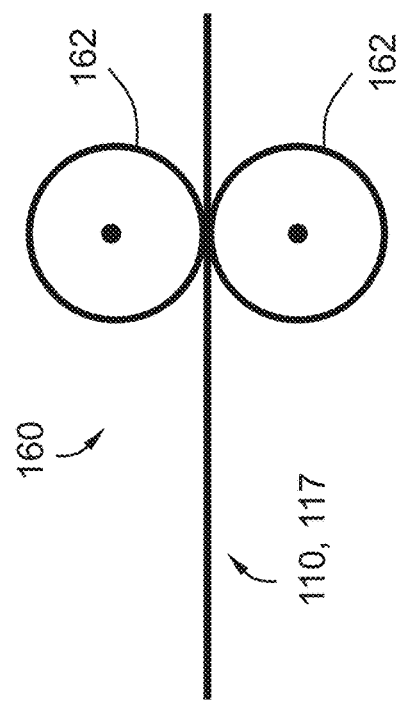
FIG. 9 provides an exemplary rolling system compacting a prepreg tape/laminate according to exemplary embodiments of the present disclosure.

FIG. 3 provides a flow diagram of an exemplary method (200) for manufacturing prepreg tapes 110 according to exemplary embodiments of the present disclosure. Reference will be made to FIGS. 4 through 9 to provide context to method (200). FIG. 4 provides a schematic view of a casting system casting a matrix material in slurry form on a carrier film to form a matrix film. FIG. 5 provides a schematic view of the matrix film being wrapped on a drum. FIG. 6 provides a schematic view of an exemplary winding system. FIG. 7 provides a schematic cross-sectional view of a fiber tow penetrating into the matrix material of the matrix film. FIG. 8 provides a schematic cross-sectional view of a prepreg laminate according to exemplary embodiments of the present disclosure. FIG. 9 provides an exemplary rolling system compacting a prepreg tape/laminate according to exemplary embodiments of the present disclosure.

At (202), as shown in FIG. 3, the method (200) includes casting a matrix material on a carrier film to form a matrix film. By way of example, with reference to FIG. 4, an exemplary casting system 120 is shown casting matrix material 112 on a carrier film 114 to form matrix film 116. The casting system 120 defines a lateral direction L and includes a casting platform 122 having a casting surface 124 on which the carrier film 114 is laid. For this embodiment, the casting surface 124 is flat. In alternative exemplary embodiments, the casting surface 124 may be curved or rounded. The casting system 120 also includes a casting dispenser 126 that is operatively configured to dispense the matrix material 112 on the carrier film 114. The casting dispenser 126 includes a doctor blade 128 that smooths or meters casted matrix material 112 to the desired thickness.

Preferably, the matrix material 112 has a slurry composition when it is cast on the carrier film 114. The slurry composition can include a resin, a suitable curing agent, a ceramic precursor or powder, a binder, a carbonaceous solids component, a suitable solvent, a combination of the foregoing, and/or other suitable constituents. Suitable ceramic precursors or powders for the slurry composition will depend on the composition desired for the ceramic matrix 106 of CMC article 100 (FIG. 1). For SiC—SiC articles, for example, suitable precursors or powders include carbon, and/or one or more other carbon-containing particulate materials. A suitable binder for use in the slurry composition is polyvinyl butyral (PVB), a commercial example of which is available from Eastman Chemicals under the name BUTVAR® B-79. Other potential candidates for the binder include other polymeric materials such as polycarbonate, polyvinyl acetate and polyvinyl alcohol. The selection of a suitable or preferred binder will depend in part on compatibility with the rest of the slurry components. Preferably, the slurry composition of the matrix material 112 during casting is in a semiliquid or liquid state such that the matrix material 112 may be spread to the desired length, width, and thickness. Suitable materials for the carrier film 114 include TEFLON® (polytetrafluoroethylene, or PTFE) or other polymeric film material that is stable (chemically nonreactive) with the constituents of the slurry composition, among other possible suitable materials.

During casting, the casting dispenser 126 moves along the lateral direction L and casts or shears the slurry matrix material 112 along the carrier film 114 as shown in FIG. 4. In FIG. 4, matrix material 112 has been cast on about half the lateral length of the carrier film 114 along the lateral direction L. The casted matrix material 112 can have any suitable thickness and width. The thickness of the matrix material 112 (and ultimately the matrix film 116) can be controlled or metered by the doctor blade 128 that smooths the matrix material 112 after it has been dispensed from the casting dispenser 126. The matrix material 112 cast on the carrier film 114 forms matrix film 116.

By casting the matrix material 112 on the carrier film 114, the matrix film 116 can be more easily removed from the casting surface 124 (once the casted matrix material 112 is sufficiently dry). The carrier film 114 also supports the casted matrix material 112 during subsequent handling, storage, and cutting. In some embodiments, matrix material 112 is cast directly on carrier film 114 to form matrix film 116. In alternative exemplary embodiments, matrix material 112 is indirectly cast on carrier film 114 to form matrix film 116. For instance, one or more intermediate layers can be positioned between the carrier film 114 and the matrix material 112 of matrix film 116. Further, in some exemplary implementations of method (200), the matrix material 112 is cast on the carrier film 114 while on a drum, as opposed to being cast on the casting surface 124 of the casting platform 122. The carrier film 114 may be wrapped about the drum and the matrix material can then be cast thereon. This may reduce the amount of handling of the matrix film 116 and may make the overall process more efficient, among other benefits.

At (204), with reference again to FIG. 3, the method (200) includes drying the matrix material of the matrix film for a predetermined time. Drying the matrix material of the matrix film for the predetermined time allows the slurry composition of the matrix material to dry to a more semi-solid or solid state such that the matrix material of the matrix film can retain its casted shape during further processing and handling. The predetermined time for drying the matrix film depends on the slurry composition, the thickness of the matrix film, the environmental conditions in which the matrix film is dried (e.g., humidity, temperature, etc.), among other factors. As one example, the matrix material is air dried for ten (10) minutes.

The matrix film can be dried in a number of suitable manners. For instance, the matrix film can be air dried, subjected to a forced airflow (e.g., a fan can blow air across the matrix film), and/or the matrix film can be subjected to elevated temperatures by a heat source. Moreover, the matrix film can be dried in a number of suitable locations. As one example, with reference to FIG. 4, after casting the matrix material 112 on the carrier film 114 to form the matrix film 116, the resultant matrix film 116 can be allowed to dry while remaining on the casting surface 124 of the casting platform 122. As another example, the casting surface 124 can be on or part of a conveyer line, and after the matrix material 112 is cast on the carrier film 114 to form the matrix film 116, the matrix film 116 can be conveyed onward along the lateral direction L to a drying station positioned forward of the casting system 120 along conveyor line.

In some exemplary implementations of method (200), the matrix material of the matrix film is dried for a predetermined time such that the matrix material has a predetermined viscosity. At some point in time, as the slurry composition of the matrix material dries, it reaches a viscosity or a range of viscosities that are optimal for introducing a reinforcement material (e.g., a fiber tow) into the matrix material. In particular, the matrix material reaches a predetermined viscosity or is within a range of viscosities that are optimal for a fiber tow to be wound into the matrix material as will be explained more fully below at (212).

At (206), in some implementations, the method (200) includes wrapping the matrix film on a drum. In FIG. 5, the matrix film 116 is shown being wrapped on a drum 130. Preferably, the matrix film 116 is wrapped on the drum 130 such that the carrier film 114 is positioned on a drum surface 132 of the drum 130 as shown in FIG. 5. In this manner, the matrix film 116, or a later formed prepreg tape 110 (FIG. 2), can more easily be removed from the drum 130. Moreover, by positioning the carrier film 114 on the drum surface 132, the matrix material 112 of the matrix film 116 is positioned such that one or more fiber tows 104 (FIG. 2) can penetrate into the matrix material 112 as will be explained more fully below. As noted above at (204), preferably, the matrix material 112 of the matrix film 116 is allowed to dry for a predetermined time before the matrix film 116 is wrapped on the drum 130. In this way, the length, width, and thickness of the matrix film 116 may better retain its casted shape when being wrapped on the drum 130. In implementations of method (200) where the matrix material 112 is cast on the carrier film 114 while on the drum 130, there is no need to wrap the matrix film 116 on the drum 130 as the casted matrix film 116 is already on the drum 130.

At (208), in some implementations with reference again to FIG. 3, the method (200) includes wetting the matrix material of the matrix film to a predetermined viscosity with a solvent. As the matrix material has been allowed to dry for a predetermined time at (204), the matrix material has transitioned from the slurry state to a semi-solid or solid state. To prepare the matrix material for the introduction of reinforcement material into the matrix material, the matrix material is wet or "wet out" with a solvent to a predetermined viscosity. Wetting the matrix material lowers the viscosity of the matrix material, which ultimately allows the reinforcement material (e.g., a fiber tow) to more easily penetrate into the matrix material and for the matrix material to impregnate the reinforcement material as will be explained at (212) more fully below.

By way of example, the matrix material can be wet or wet out as follows. With reference to FIG. 6, an exemplary winding system 140 is depicted. The winding system 140 defines vertical direction V, lateral direction L, and transverse direction T. Each of the vertical direction V, lateral direction L, and transverse direction T are mutually perpendicular to one another and form an orthogonal direction system. The winding system 140 includes a wetting apparatus or solvent dispenser 142 operatively configured to dispense a solvent 144 on the matrix material 112 of the matrix film 116, which is wrapped on the drum 130 in the depicted embodiment of FIG. 6. The solvent 144 can be any suitable type of solvent capable of wetting the matrix material 112 to the predetermined viscosity and content. As one example, the solvent is isopropanol ($C_3H_8O$). Other potential candidates for the solvent include ethanol, butanol, various aromatics, and blends or combinations thereof.

In FIG. 6, the solvent dispenser 142 is shown positioned proximate the drum 130 with the matrix film 116 wrapped thereon. In this embodiment, to wet the matrix material 112 to the predetermined viscosity and content, the solvent dispenser 142 dispenses solvent 144 onto the matrix material 112 of the matrix film 116. Preferably, the matrix material 112 is wet with the solvent 144 such that the predetermined viscosity of the matrix material 112 of the matrix film 116 is high enough to prevent the plurality of fibers 108 of the fiber tow (FIG. 2) from bunching on the drum surface 132 (FIG. 5) of the drum 130 during winding at (212) and low enough to allow the fiber tow 104 to penetrate into the matrix material 112 and for the matrix material 112 to penetrate about each of the plurality of fibers 108 of the fiber tow 104 to impregnate the fiber tow 104. That is, preferably, the predetermined viscosity is set such that matrix material 112 penetrates about the fibers 108 of the fiber tow 104 and about ninety percent (90%) or more of the space between the fibers 108 of the fiber tow 104 is filled with matrix material 112. Accordingly, in such preferred embodiments, most of the fibers 108 are in direct contact with matrix material 112. As one example, the fibers 108 are impregnated such that ninety percent (90%) or more of the space between the fibers 108 of the fiber tow 104 is filled with matrix material 112. As another example, the fibers 108 are impregnated such that ninety-eight percent (98%) or more of the space between the fibers 108 of the fiber tow 104 is filled with matrix material 112. The space or matrix voids between the fibers 108, in this context, may be acceptably determined using standard quality control methods commonly applied in the manufacturing arts, such as by examining a representative cross sectional sampling in one or more regions along the length of the fiber tow 104. The matrix material 112 of the matrix film 116 may be wet to the predetermined viscosity with solvent 144 before winding at (212) or during winding at (212). The matrix material 112 may be wet out during winding at (212) as needed to maintain the predetermined viscosity of the matrix material 112.

At (210), additionally or alternatively to wetting the matrix material, in some exemplary implementations of method (200), prior to or during winding the fiber tow on the drum at (212), the method (200) includes wetting the fiber tow. Wetting the fiber tow can be done in a number of suitable fashions. For instance, in some implementations, wetting the fiber tow includes wetting the fiber tow with a solvent. In yet other exemplary implementations, wetting the fiber tow includes impregnating the fiber tow with a slurry that includes one or more solvents, a ceramic precursor or powder, and an organic binder.

By way of example, with reference to FIG. 6, as shown, prior to being wound on the drum 130 to penetrate the matrix material 112 of the matrix film 116, the fiber tow 104 is pulled or fed through and immersed in a bath 154. In this example, the bath 154 is filled with a suitable solvent. In the depicted of FIG. 6, the bath 154 is positioned between the reinforcement drum 146 and the drum 130. By immersing the fiber tow 104 in the bath 154 filled with solvent prior to winding the fiber tow 104 on the drum 130, the fiber tow 104 is wet out so that the fiber tow 104 may penetrate into the matrix material 112 more easily. The bath 154 can contain any suitable solvent capable of wetting out the fiber tow 104. As one example, the solvent can be isopropanol. Other potential candidates for the solvent include ethanol, butanol, various aromatics, and blends or combinations thereof.

As another example, with reference still to FIG. 6, prior to being wound on the drum 130 to penetrate the matrix material 112 of the matrix film 116, the fiber tow 104 is pulled or fed through and immersed in a bath 154, which in this embodiment, is filled with a matrix material having a slurry composition. The slurry composition includes one or more solvents, a ceramic precursor or powder, and an organic binder. By immersing the fiber tow 104 in the bath 154 filled with the matrix slurry composition prior to winding the fiber tow 104 on the drum 130, the fiber tow 104 is wet out so that the fiber tow 104 may penetrate into the matrix material 112 more easily, and additionally, when the wet out fiber tow 104 is wound on the drum at (412), the wet fiber tow 104 wets the matrix material 112 in which it is wound.

At (212), with reference again to FIG. 3, the method (200) includes winding a plurality of fibers about a drum so that the plurality of fibers penetrate into the matrix material and the matrix material impregnates the fiber tow to form the prepreg tape, wherein during winding, the matrix material has a predetermined viscosity. As noted above, the matrix material can be dried for a predetermined time such that the matrix material has a predetermined viscosity, the matrix material can be wet with a solvent such that the matrix material has a predetermined viscosity, the fiber tow can be wet with a solvent such that when the fiber tow is wound on the drum the matrix material can be wet to a predetermined viscosity, and additionally or alternatively, the fiber tow can be wet with a matrix material slurry composition such that when the fiber tow is wound on the drum the matrix material can be wet to a predetermined viscosity.

A plurality of fibers of a fiber tow can be wound about a drum in the following exemplary manner. As shown in FIG. 6, the fiber tow 104 is fed or pulled from a reinforcement drum 146 that supplies the fiber tow 104 to a tension system 134. The reinforcement drum 146 rotates on an axle connected to a force-adjusting device 147 such as a friction brake, pneumatic brake, electromechanical brake, or a torque motor. A first controller 136 is communicatively coupled with the force-adjusting device 147 and one or more sensors (not labeled) of the tension system 134. The first controller 136 receives tension signals from the one or more sensors of the tension system 134 and adjusts the output signal to the force-adjusting device 147 so that the tension is controlled at a set point. After passing through tension system 134, the fiber tow 104 is fed or pulled to a steering bobbin 148 rotatably mounted on an axle 150. The bobbin 148 is rotatable about the transverse direction T, either as a low-friction free-rotating idler roll or can be driven by a motor, and is controllably movable along the transverse direction T to control the angle of the fiber tow 104 as it comes off the bobbin 148 and is wound about the drum 130. In the depicted embodiment of FIG. 6, the fiber tow 104 is shown being wound about the drum 130, which is rotating in a clockwise direction CW. As the bobbin is controllably moveable along the transverse direction T, the fiber tow 104 can be wound along the width of the matrix film 116 along the transverse direction T. As one example, the tow of each tow winding revolution can touch the tow of a tow winding from the previous drum revolution, which may, for example, yield a continuous, unidirectional prepreg tape.

As further shown in FIG. 6, the winding system 140 includes a second controller 137 operatively configured to control the speed of the drum 130 as well as the transverse movement of the tow being wound on the drum 130. As shown, the second controller 137 is communicatively coupled with the drum 130. Second controller 137 controls a motor driving the drum 130 to control the wind rate or revolutions per minute of the drum 130. Moreover, the second controller 137 controls the position of the steering bobbin 148 in a fixed relationship to the drum rotation so that the set point pitch of the fiber tow 104 is achieved, for example by controlling the speed of a motor driving a linear slide 139 to which the axle 150 of the steering bobbin 148 is coupled. In this way, the second controller 137 is communicatively coupled with the driving device of linear slide 139. In some implementations, the second controller 137 may control the rotational speed of the bobbin 148 by controlling a motor attached to the axle 150. One or more sensors can provide feedback to the second controller 137 such that the position of the bobbin 148 and the rotational speed of the drum 130 are known to the second controller 137 so that the second controller 137 can control the speed of the drum 130 and the transverse position of the bobbin 148 accordingly.

In addition, as further shown in FIG. 6, a third controller 138 controls the solvent dispenser 142 such that the amount of solvent 144 dispensed from solvent dispenser 142 can be controlled so that the matrix material 112 can be wet to the predetermined viscosity. For instance, the third controller 138 can regulate the flow of solvent 144 through a pump in the solvent dispenser 142, and if the dispenser 142 is narrower than the transverse width of the matrix film 116 mounted on the drum 130, the third controller 138 can control the transverse position of the dispenser 142. Stated differently, the solvent dispenser 142 is moveable along the transverse direction T.

The controllers 136, 137, 138 may include a discrete processor and memory unit (not pictured). The processor may include a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. The processor may also include a microprocessor, or a combination of the aforementioned devices (e.g., a combination of a DSP and a microprocessor, a plurality of microprocessors, one or more microprocessors in conjunction with a DSP core, or any other such configuration).

Additionally, the memory device(s) may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD), and/or other suitable memory elements. The memory can store information accessible by processor(s), including instructions that can be executed by processor(s). For example, the instructions can be software or any set of instructions that when executed by the processor(s), cause the processor(s) to perform operations. For the embodiment depicted, the instructions include a software package configured to operate the controller 136, 137, 138 to, e.g., execute the exemplary method (200) and/or other methods disclosed herein. Although the controllers 136, 137, 138 are shown as separate controllers, in alternative exemplary embodiments, a single controller can be provided in place of the separate components. In yet other embodiments, the winding system 140 can include more controllers than illustrated in the FIG. 6.

Moreover, as further shown in FIG. 6, as the matrix film 116 is already wrapped on the drum 130 and the matrix material 112 of the matrix film 116 has a predetermined viscosity, the fiber tow 104 penetrates into the matrix material 112 when the fiber tow 104 is wound about the drum 130. The winding of the fiber tow 104 about the drum 130 drives the fiber tow 104 into the matrix material 112. As the matrix material 112 has a predetermined viscosity, the fiber tow 104 may more easily penetrate into the matrix material 112. Additionally, as the matrix material has a predetermined viscosity, when the fiber tow 104 penetrates into the matrix material 112, the matrix material 112 is able to penetrate into the fiber tow 104 and impregnate matrix material 112 about the fibers 108. Further, the winding of the fiber tow 104 about the drum 130 locks the fiber tow 104 into place within the matrix material 112.

As shown particularly in FIG. 7, a close up view of the fiber tow 104 being wound about the drum 130 is provided. As shown, the fiber tow 104 has been wound about the drum 130 a first and second winding revolution R1, R2. During the first and second winding revolutions R1, R2, as shown, the fiber tow 104 penetrated into the matrix material 112 and the matrix material 112 penetrated into the fiber tow 104 and about the fibers 108 to impregnate the fiber tow 104. The fibers 108 have substantially uniform spacing between them as the matrix material 112 was able to penetrate into the fiber tow 104 and between the fibers 108. As further shown in FIG. 7, the fiber tow 104 is in the process of being wound about the drum 130 a third winding revolution R3. As shown, as the fiber tow 104 is wound about the drum 130 for the third winding revolution R3, the fiber tow 104 is driven radially inward into the matrix material 112 by force F. The force F on the fiber tow 104 causes the fiber tow 104 to spread transversely and penetrate into the matrix material 112 and also causes the matrix material 112 to penetrate into the plurality of fibers 108 of the fiber tow 104 as shown by the arrows labeled by the letter P such that the fiber tow 104 is impregnated with matrix material 112. For subsequent revolutions of fiber tow 104, the fiber tow 104 will be driven into the matrix material 112 as noted above until the fiber tow 104 is wound about the width W of the matrix film 116 along the transverse direction T. When the fiber tow 104 has been wound about the drum 130 and the fiber tow 104 has penetrated into the matrix material 112 and the matrix material 112 has penetrated into the fiber tow 104 and dispersed about the plurality of fibers 108 to impregnate the fiber tow 104, the prepreg tape 110 (FIG. 2) is formed.

Advantageously, by manufacturing prepreg tapes utilizing exemplary method (200), improved impregnation of the fibers and improved matrix distribution across the thickness of the formed prepreg tapes may be achieved. As described above, as the fiber tow is wound about the drum, the winding force drives the fiber tow into the matrix material wet to the predetermined viscosity, which in turn allows the matrix material to penetrate into the fiber tow and disperse about the fibers with sufficient force to spread about them to impregnate the fiber tow. The pitch, tension, and feed/pull rate of the fiber tow can be controlled such that the fiber tow penetrates into the matrix material with the desired force for optimal impregnation and matrix distribution across the thickness. Further, uniform spacing between the fibers can be achieved with use of exemplary method (200). For instance, the winding system can control the fiber tow to penetrate into the matrix material with a consistent force to provide uniform spacing between the fibers of the tow. In addition, one or more sensors can be positioned proximate the drum and can sense the viscosity of the matrix material. Depending on the sensed viscosity, the winding system can increase the force of the fiber tow penetrating into the matrix material or can adjust other variables, such as e.g., controlling dispenser to dispense additional solvent onto the matrix material. Thus, method (200) also allows for control of the viscosity of the matrix material, both prior to and during winding of the fiber tow about the drum.

In addition, advantageously, by manufacturing prepreg tapes utilizing exemplary method (200), the fiber tow need not be pulled through a slurry bath to impregnate the fiber tow with matrix material or metered through an orifice to remove excess matrix material as in conventional techniques. Moreover, as the matrix material is casted to form a matrix film, the matrix content and matrix film shape can be better controlled in comparison to conventional techniques. Yet other advantages of utilizing method (200) to form prepreg tapes include ease of handling and intermediate storage of the matrix film and fiber tows.

At (214), in some implementations during winding at (212), the method (200) includes compacting the fiber tow into the matrix material of the matrix film to form the prepreg tape. With reference again to FIG. 6, as shown, a roller 152 is shown positioned proximate the drum 130. As the fiber tow 104 is wound about the drum 130 in the clockwise direction CW, the roller 152 rotates in a counter clockwise direction CCW to compact the fiber tow 104 into the matrix material 112. Thus, the roller 152 rotates opposite the drum about the transverse direction T. By compacting the fiber tow 104 during the winding process, it is further assured that the fibers 108 (FIG. 2) of the fiber tow 104 are locked into place within the matrix material 112 and that the fiber tow 104 has penetrated the desired distance into the matrix material 112. In some implementations, the roller 152 rotates freely and so that the drum 130 and roller 152 rotate opposite one another at the same speed. In yet other implementations, the roller 152 can be driven by a motor at a similar speed as the drum 130.

At (216), in some implementations, prior to or during winding at (212), the method (200) includes applying heat to the matrix film to soften or further soften the matrix material of the matrix film. By way of example, with reference again to FIG. 6, a heating element 156 is positioned proximate the drum 130. The heating element 156 can be any suitable type of heating element, such as e.g., an electric heater. As the drum 130 is rotated in the clockwise direction CW about the transverse direction T, heat given off by the heating element 156 exchanges heat with the matrix material 112 positioned proximate the heating element 156, which warms and softens the matrix material 112. By softening or decreasing the viscosity of the matrix material 112 with the application of heat, when the fiber tow 104 is wound on the drum 130, the fibers 108 (FIG. 2) of the fiber tow 104 may penetrate more easily into the softer matrix material 112 and the matrix material 112 may more easily penetrate about each of the fibers 108 of the fiber tow 104. In this way, the matrix material 112 may be more evenly spread between each fiber 108 of the fiber tow 104.

As noted above, in some implementations, heat can be applied to the matrix material 112 before the fiber tow 104 is wound on the drum 130 and penetrated into the matrix material 112. For instance, the drum 130 and wrapped matrix film 116 can be rotated about the transverse direction T to warm and soften the matrix material 112 prior to introduction of the fiber tow 104. Additionally or alternatively, heat can be applied to the matrix material 112 during winding, or as the fiber tow 104 is wound about the drum 130 to penetrate the fiber tow 104 into the matrix material 112.

At (218), in some implementations of method (200), after winding at (212), the method (200) includes drying the prepreg tape for a predetermined time. By allowing the prepreg tape to dry for a predetermined time, the wet out matrix material is allowed to transition back to a more solid form. As the matrix material transitions back to a more solid form, the now embedded fiber tow becomes further locked into position within the matrix material. The prepreg tape can be dried in various ways. For instance, the prepreg tape can be air dried, subjected to a forced airflow (e.g., a fan can blow air across the prepreg tape), and/or the prepreg tape can be subjected to elevated temperatures by a heat source. After the prepreg tape is dried for the predetermined time, in some implementations, the method (200) further includes removing the prepreg tape from the drum. The prepreg tape can be removed from the drum by any suitable method. For example, the prepreg tape can be cut from the drum.

At (220), in some implementations, after drying the prepreg tape for a predetermined time at (218), the method (200) includes covering the prepreg tape with a cover film to form a prepreg laminate. With reference to FIG. 8, prepreg tape 110 is shown having carrier film 114 positioned at one of its surfaces and a cover film 118 positioned at the surface opposite the carrier film 114. By adding cover film 118 to the prepreg tape 110 to form the prepreg laminate 117, the rate of solvent evaporation from the prepreg tape 110 is slowed and the solvent vapors are trapped inside the prepreg tape 110. The effect is to homogenize the solvent content of the prepreg tape 110 through its thickness and across its width. Suitable materials for the cover film 118 include TEFLON® (PTFE) or another polymeric film material that is stable (chemically nonreactive) with the constituents of the matrix material, such as e.g., polyethylene terephthalate.

At (222), in some implementations, the method (200) includes compacting the prepreg tape, and in implementations where the prepreg tape is a prepreg laminate with a cover film, the method (200) includes compacting the prepreg laminate. Preferably, the prepreg laminate is wet enough for the matrix slurry to flow to uniformly re-distribute the matrix throughout the prepreg laminate, but dry enough and thus high enough viscosity so that matrix slurry does not squeeze out of the end of the prepreg laminate. By way of example, FIG. 9 provides an exemplary rolling system 160 operatively configured to compress and flatten prepreg tapes and/or laminates. As shown in FIG. 9, for this embodiment, the rolling system 160 includes a pair of rollers or nip rollers 162. To compress and flatten the prepreg tape 110 and/or prepreg laminate 117, the prepreg tape 110 or prepreg laminate 117 is passed between the rollers 162. The gap between the rollers 162 can be set to slightly compress the prepreg tape 110 or prepreg laminate 117 as it is passed therethrough. Preferably, the gap between the rollers can vary and the force between rollers is controlled between 2 and 50 lbs/inch, more preferably between 4 and 25 lbs/inch. Preferably, the prepreg tape 110 or laminate 117 is fed slowly through rollers 162 at a relatively low feed rate. As one example, the feed rate may be about 16 inches (about 40.6 cm) per minute with the direction of feed through the rollers 162 being parallel to the direction of the fibers 108 of the fiber tow 104 within the prepreg tape 110. Moreover, preferably, the prepreg tape 110 or laminate 117 is fed through the rollers 162 at a sufficiently low speed to facilitate both flow of the matrix material to improve its uniformity and the removal of air trapped between the carrier film 114 and prepreg tape 110 or within the prepreg tape 110. In addition, the prepreg tape 110 or laminate 117 can be run through the rollers 162 and then flipped over and run through a second time. The prepreg tape 110 or laminate 117 can additionally be run through the rollers 162 additional times.

Figure 10:
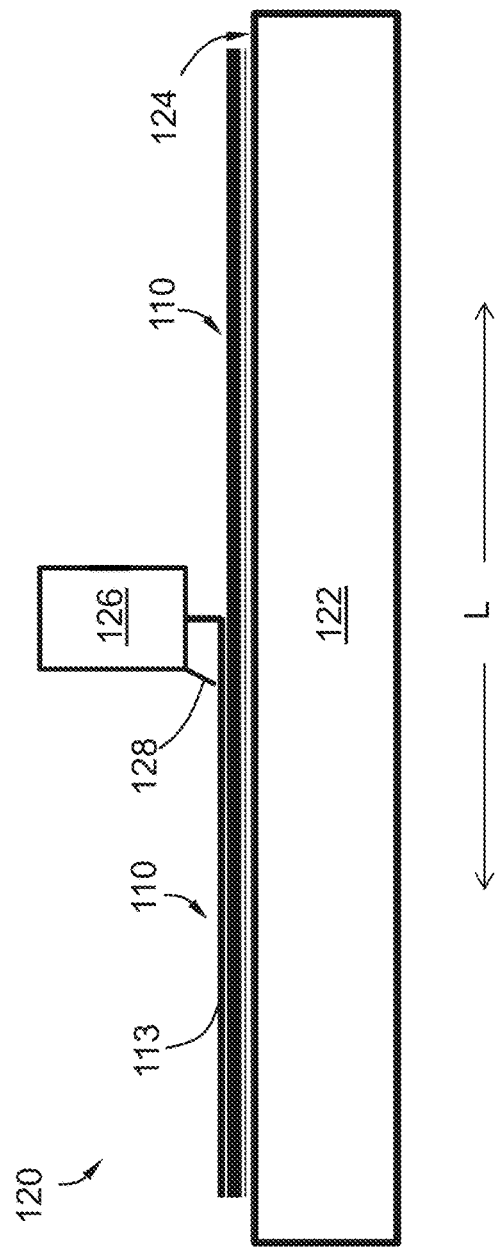
FIG. 10 provides a schematic view of a second matrix material being cast on the prepreg tape according to exemplary embodiments of the present disclosure.

In some further implementations, after drying the prepreg tape for the predetermined time at (218), the method (200) includes casting a second matrix material on the prepreg tape. By way of example, FIG. 10 provides a schematic view of a second matrix material 113 being cast on the prepreg tape 110 according to exemplary embodiments of the present disclosure. As shown in FIG. 10, the prepreg tape 110 is laid on the casting surface 124 of the casting platform 122. The casting dispenser 126 is shown moving along the lateral direction L and casting second matrix material 113 on prepreg tape 110. In FIG. 10, casting dispenser 126 has dispensed second matrix material 113 on the prepreg tape 110 along about half the lateral length of the prepreg tape 110. When second matrix material 113 is cast, preferably the second matrix material 113 has a slurry composition. The slurry composition of the second matrix material 113 can include the same or similar constituents as the matrix material 112. The thickness of the second matrix material 113 can be metered or controlled by the doctor blade 128 that smooths the second matrix material 113 after it has been cast from the casting dispenser 126.

In some instances, it may be desirable to cast second matrix material 113 on prepreg tape 110, as noted above. For example, in some instances, second matrix material 113 can be cast on prepreg tape 110 to shape the top layer of the prepreg tape 110 to a desired shape. As another example, second matrix material 113 can be cast on prepreg tape 110 to form a smoother top layer of the prepreg tape 110 such that when prepreg tape 110 is laid up with other prepreg tapes 110 to form a preform, the prepreg tapes may be laid up more easily. As yet another example, second matrix material 113 can be cast on the prepreg tape 110 to add additional thickness to the prepreg tape 110.

Figure 11:
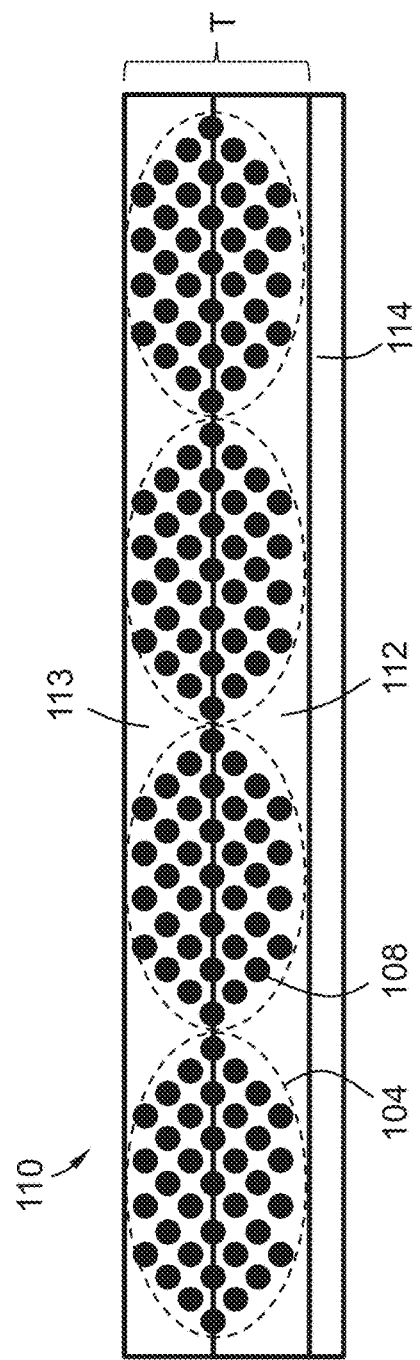
FIG. 11 provides a schematic cross-sectional view of a prepreg tape formed with a first layer of matrix material and a second layer of a second matrix material according to exemplary embodiments of the present disclosure.

As yet another example, in some instances, due to machine and/or other constraints, the force F (FIG. 7) may be insufficient to drive the fiber tow into the thickness of the matrix material when the fiber tow is wound on the drum at (212). In such instances, as shown in FIG. 11, the thickness T of the matrix material of the prepreg tape 110 can be cast in separate casting operations. For instance, the matrix material 112 can be cast in a manner as described at (202) and illustrated in FIG. 4, and the second matrix material 113 can be cast as shown in FIG. 10 and described in the accompany text. By casting the matrix material of the prepreg tape 110 in separate casting operations, when the fiber tow is wound about the drum 130 (FIG. 6), the fiber tow 104 can penetrate into the matrix material 112 more easily as the matrix material 112 is less thick. Then, to form the remaining thickness T of the prepreg tape 110, the second matrix material 113 is cast in a manner noted above. Notably, as the fiber tow 104 is held in place at least in part by the matrix material 112, when the second matrix material 113 is cast thereon, the fiber tows 104 are held in place and do not slip. Stated alternatively, the matrix material 112 in which the fiber tow 104 is embedded holds the fiber tow 104 in place and prevents the fiber tow 104 from moving when the second matrix material 113 is cast upon the matrix material 112 of the prepreg tape 110.

After casting the second matrix material on the prepreg tape to form the prepreg laminate, the method (200) further includes drying the second matrix material of the prepreg tape. The prepreg laminate can be dried in any of ways noted above. Thereafter, a cover film may be added and the prepreg laminate can then be compacted. Alternatively, after drying, the prepreg tape can be compacted without being covered.

In some implementations, after winding at (212) and preferably after drying at (218), the method (200) further includes casting a second matrix material on a cover film to form a cover film laminate. The method (200) also includes covering the prepreg tape with the cover film laminate to form a prepreg laminate.

Figure 12:
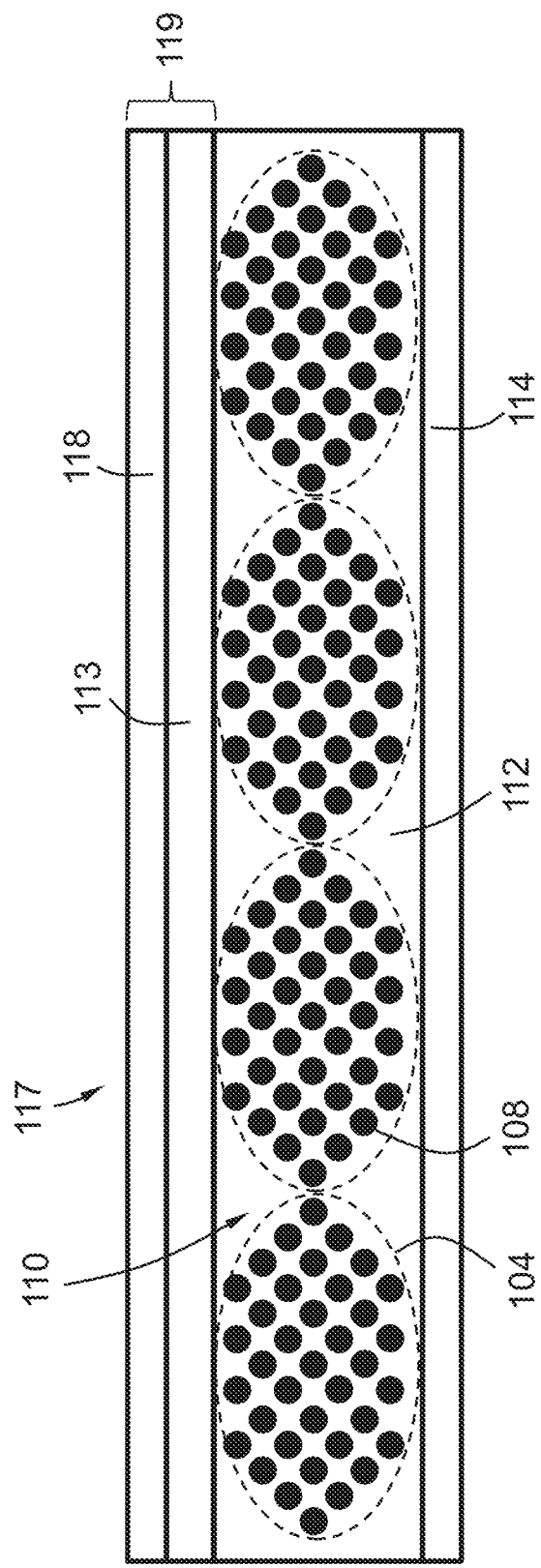
FIG. 12 provides a schematic cross-sectional view of another prepreg tape with a layer of a second matrix material casted on a cover film and applied thereon according to exemplary embodiments of the present disclosure.

The second matrix material can be cast on a cover film in the same or similar manner as described above with reference to FIG. 4 and the accompanying text. Once the second matrix material is cast on the cover film, a cover film laminate is formed. Once the cover laminate is dried for a predetermined time, the cover film laminate can cover the prepreg tape. For example, as shown in FIG. 12, the cover film laminate 119 is shown covering the prepreg tape 110 to form the prepreg laminate 117. By casting a second matrix material onto a cover film and then covering the prepreg tape with the formed cover film laminate, the thickness of the prepreg tape/laminate can be increased and it can be assured that matrix material is formed along the top side of the prepreg tape (i.e., the side opposite the carrier film 114).

In some further implementations, prior to covering the prepreg tape with the cover film laminate to form a prepreg laminate, the method (200) further includes drying the second matrix material of the cover film laminate for a predetermined time and then wetting the second matrix material of the cover film laminate. By allowing the matrix material to dry, the second matrix material can transition from its slurry composition to a semi-solid state. This makes the cover film laminate easier to handle and transport. Then, prior to covering, the second matrix material is wet, e.g. with a solvent, so that the second matrix material becomes soft and pliable. In this way, when the cover film laminate is laid over the prepreg tape to cover it, the second matrix material more easily molds into the desired shape and is fills the contours or valleys of the surface of the prepreg tape. This ultimately may provide a prepreg tape or finished CMC article with improved mechanical properties. After covering the prepreg laminate with the cover film laminate, as noted above, the prepreg laminate can be compacted by passing prepreg laminate through nip rollers as shown in FIG. 9 and described in the accompanying text. By compacting the prepreg laminate and the additional layer of second matrix material, the thickness of the laminate can be controlled to a desired thickness. Among other potential benefits and uses, by adding a second matrix material layer on the cover film, the matrix material can increase the thickness of the laminate to the desired thickness and assure that there is sufficient matrix at the top surface of the prepreg to improve adhesion to adjacent layers or prepreg tapes when they are laid up. Moreover, the additional second matrix material layer can form a more anisotropic wear surface of the prepreg tape, compared to a more isotropic outer layer of the prepreg tape formed of both fibers and matrix material.

After compacting at (222), in some implementations, the method (200) further includes laying up the prepreg tape or laminate with at least a second prepreg tape manufactured by method (200) to yield a laminate preform. Once the preform is laid up, the method (200) also includes curing the laminate preform to convert the ceramic precursor or powder of the matrix material 112 (FIG. 2) to a ceramic matrix material 106 (FIG. 1) to yield a CMC article, such as e.g., CMC article of FIG. 1.

The laminate preform can be cured in the following exemplary manner. After the prepreg tapes are laid up to form the preform laminate, the preform laminate can undergo a compaction process, a burnout process, and a melt infiltration process to cure the preform. More specifically, after the layup process, the laminate preform can be processed in an autoclave and subjected to elevated temperatures and pressures to produce a compacted, green state article. Various volatiles can be removed during compaction. Then, the green state article can be placed in a furnace to burn out excess binders or the like and then can be placed in a furnace with a piece or slab of silicon and fired to melt infiltrate the article with at least silicon. More particularly, heating (i.e., firing) the green state article in a vacuum or inert atmosphere decomposes the binders, removes the solvents, and converts the precursor or powder to the desired pyrolyzed material. The decomposition of the binders results in a porous pyrolyzed body; the body may undergo densification, e.g., melt infiltration (MI), to fill the porosity. In one example, where the pyrolyzed article is fired with silicon, the article can undergo silicon melt-infiltration. However, densification can be performed using any known densification technique including, but not limited to, Silcomp, melt infiltration (MI), chemical vapor infiltration (CVI), polymer infiltration and pyrolysis (PIP), and oxide/oxide processes, and with any suitable materials including but not limited to silicon. In one embodiment, densification and firing may be conducted in a vacuum furnace or an inert atmosphere having an established atmosphere at temperatures above 1200° C. to allow silicon or other appropriate material or combination of materials to melt-infiltrate into the article.

Thereafter, the densified composite article can be finish machined as necessary. For instance, the article can be grinded or otherwise machined, e.g., to bring the article within tolerance and to shape the article to the desired shape. It will be appreciated that other methods or processes for curing composite articles can be used as well.

Figure 13:
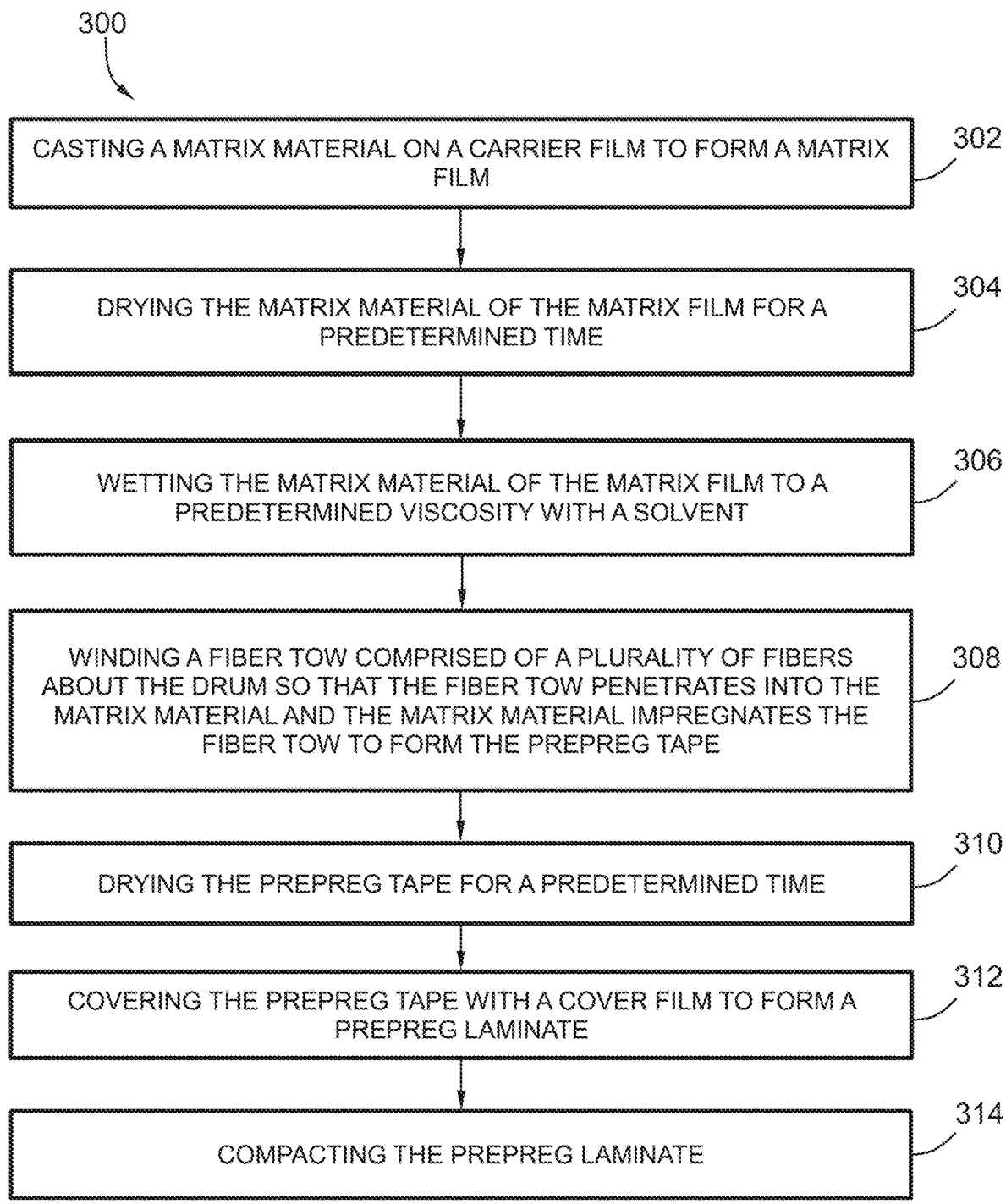
FIG. 13 provides a flow diagram of another exemplary method according to exemplary embodiments of the present disclosure.

FIG. 13 provides a flow diagram of another exemplary method (300) for manufacturing a prepreg tape according to exemplary embodiments of the present disclosure.

At (302), the method (300) includes casting a matrix material on a carrier film to form a matrix film. For instance, the matrix material can be cast on the carrier film in the same or similar manner as shown in FIG. 4 and described in the accompanying text. The matrix material of the matrix film can have a ceramic precursor or powder and an organic binder. During casting, the matrix material can have a slurry composition. In some implementations, during casting, the matrix material is cast on the carrier film while on the drum. Stated alternatively, the matrix film can be formed while on the drum. For instance, the carrier film can be laid on or adhered to a drum surface of the drum and then the matrix material can be cast on the carrier film. By casting the matrix material on the carrier film while on the drum, the matrix film need not be transported or otherwise handled prior to introduction of the reinforcement material into the matrix material of the matrix film. In this way, the process can be streamlined.

At (304), the method (300) includes drying the matrix material of the matrix film for a predetermined time. In some implementations, when the matrix material is cast on the carrier film to form the matrix film, the matrix material has a slurry composition, which typically has a semi-liquid state. By allowing the matrix material to dry for the predetermined time, the slurry composition is able to transition to a more semi-solid or solid state.

At (306), the method (300) includes wetting the matrix material of the matrix film to a predetermined viscosity with a solvent. For instance, a wetting apparatus can be used to wet the matrix material. In some implementations, the wetting apparatus can be the solvent dispenser 142 of FIG. 6 that is configured to dispense solvent onto the matrix material of the matrix film. In yet other implementations, the wetting apparatus can be bath 154 of FIG. 6 filled with a solvent. The bath can be used to wet the fiber tow with solvent, which can, for example, be used to wet the matrix material when the fiber tow is wound thereon at (308). In further implementations the wetting apparatus can be bath 154 of FIG. 6 filled with a slurry matrix composition. The bath can be used to wet the fiber tow with the slurry, which can be used to wet the matrix material when the fiber tow is wound thereon at (308).

At (308), the method (300) includes winding a fiber tow comprised of a plurality of fibers about the drum so that the fiber tow penetrates into the matrix material and the matrix material impregnates the fiber tow to form the prepreg tape. As explained above with reference to FIG. 6, the fiber tow 104 is wound on the drum 130 so that the fiber tow 104 penetrates into the matrix material 112 and the matrix material 112 impregnates the fiber tow 104 to form the prepreg tape 110 (FIG. 2). That is, the matrix material 112 impregnates the fiber tow 104 by filling into the spaces between the fibers 108 of the fiber tow 104.

At (310), the method (300) includes drying the prepreg tape for a predetermined time. This allows the wet matrix material and the wet, embedded fiber tow of the prepreg tape to settle into place such that the prepreg tape can be further handled and/or processed.

At (312), the method (300) includes covering the prepreg tape with a cover film to form a prepreg laminate. For instance, the prepreg tape can be covered as illustrated in FIG. 8 and described in the accompanying text.

At (314), the method (300) includes compacting the prepreg laminate. By compacting the prepreg laminate, the matrix material and fibers are further locked into place, the prepreg tape is driven to the desired thickness, and the distribution of matrix is made more uniform, among other benefits of compacting. For instance, the prepreg laminate can be compacted as illustrated in FIG. 9 and described in the accompanying text.

In some implementations of the method (300), the drum includes a drum surface. Moreover, in such implementations, the predetermined viscosity of the matrix material of the matrix film is high enough to prevent the plurality of fibers from bunching on the drum surface during winding and low enough to allow the matrix material to penetrate about each of the plurality of fibers. In some implementations, during winding, the method (300) further includes compacting the fiber tow into the matrix material of the matrix film. For instance, the roller 152 of FIG. 6 can compact the fiber tow into the matrix material 112 during winding. In yet other implementations, prior to or during winding, the method further includes applying heat to the matrix film to soften the matrix material of the matrix film.

In some implementations of method (300), various aspects discussed above with regard to method (200) can be implemented in method (300). For example, in some implementations of method (300), prior to or during winding, the method (300) further includes applying heat to the matrix film to soften the matrix material of the matrix film. As yet another example, the method (300) can include removing the prepreg from the drum, laying up the prepreg with at least a second prepreg manufactured by method (300) to yield a laminate preform, and then curing the laminate preform to convert the ceramic precursor or powder to a ceramic matrix material to yield a ceramic matrix composite material article.

Various examples of prepreg tapes and panels of cured prepreg tapes are provided below. All examples used Hi-Nicolon® Type S fiber tows coated with boron nitride, silicon nitride, and carbon. The matrix slurry composition used in the examples contained about 20% SiC ceramic powder and about 17% carbon powder as ceramic precursor, about 17% organic binders, and about 46% solvents for the binders. Process parameters were chosen to give about 0.004 inches thickness of matrix in the final prepreg tapes. For all examples, to compact the prepreg tapes, the prepreg tapes were covered with a polyester film of about 0.002 inches thick having a silicone release coating and compacted in a roller nip at a speed of about 1.4 ft/min and a force of about 5 lbs/in. Small samples of prepreg tapes were thoroughly dried and imaged in cross-section on a high-resolution CT scanner. Test panels were fabricated by cutting the prepreg tapes into 2-inch square plies, laying-up 8-ply panels with alternating 0-90 degree fiber orientation, and vacuum-bag laminated in an autoclave at about 350° F. and about 75 psi for about 6 (six) hours. The resulting compacted preforms were then heated to about 575° C. in a vacuum furnace, held at temperature for about three (3) hours, then cooled to room temperature. They were then contacted with silicon metal via a carbon wick, heated in a vacuum furnace to about 1450° C., and then held at temperature for about one (1) hour. At this temperature, the silicon melted and wicked into the preform panels via capillarity. After cooling to room temperature, cross-sectional images were prepared by potting the panels in epoxy, cutting, polishing, and imaging with optical microscopy.

Figure 14:
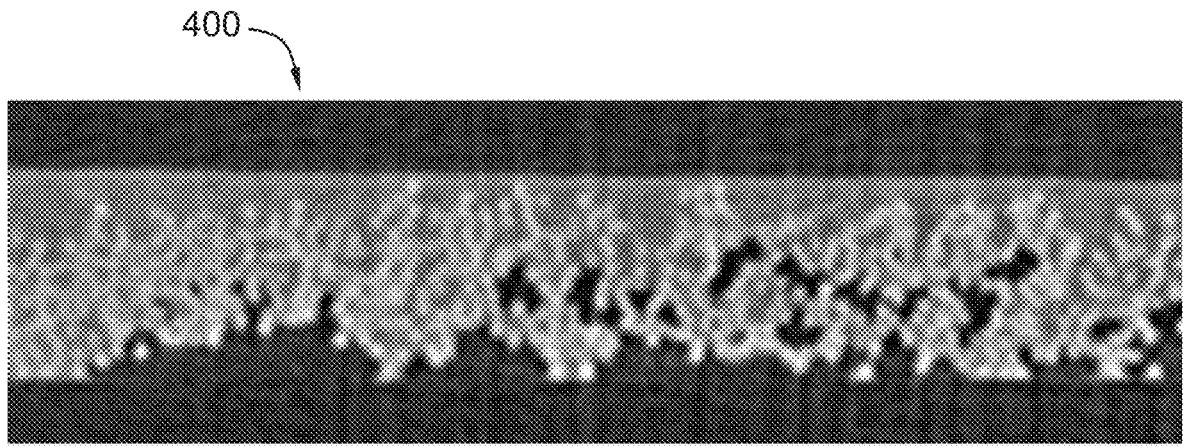
FIG. 14 provides a cross sectional view of a prepreg tape manufactured in accordance with known prior art methods.
Figure 15:
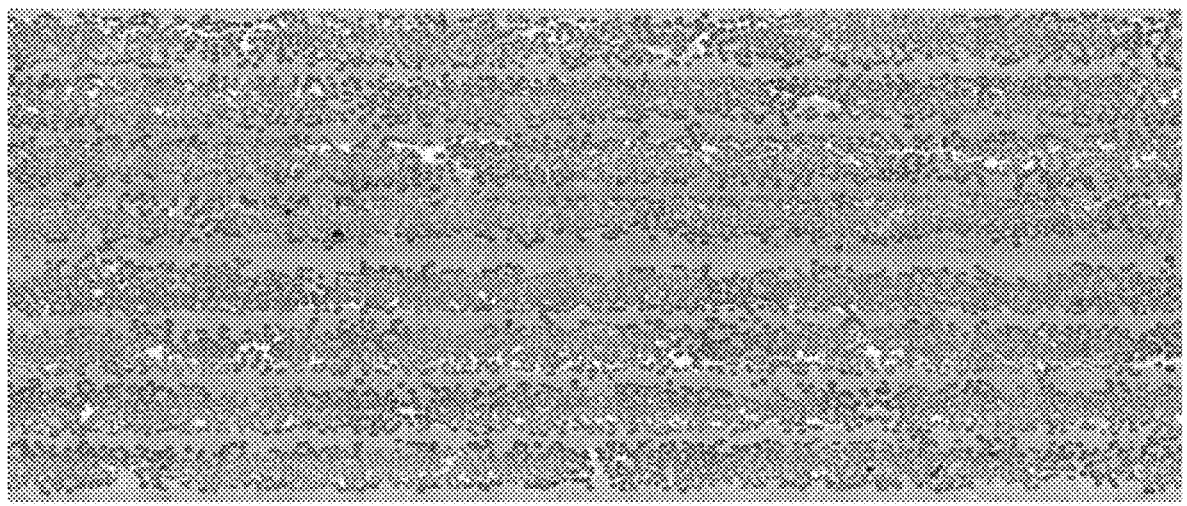
FIG. 15 provides a cross sectional view of a panel of prepreg tapes manufactured in accordance with known prior art methods.

Prior Art: For comparison purposes, a prepreg tape was manufactured in accordance with known prior art methods. In this prior art example, the fiber tow was impregnated with matrix slurry in a conventional slurry bath known in the art (as described in the Background), passed through a die of about 0.032 inches diameter to remove excess matrix slurry, and wound on a drum at 0.045-inch spacing at about 33 ft/min at a tension of about two hundred (200) grams to form a wet prepreg. After drying for a predetermined time, the prepreg tape was cut off the drum and compacted as described above. FIG. 14 provides the prepreg tape 400 formed by prior art methods. As shown, the drum side 402 of the prepreg tape 400 is fiber-rich and severely lacking in matrix while the top side opposite the drum side 402 has a thick layer of matrix with no fiber. FIG. 15 provides a panel 404 formed of prepreg tapes 200 manufactured by prior art methods, such as the prepreg tape 400 of FIG. 14, having distinct wide bands of fiber-rich regions separated by regions of all matrix and no fiber. Further, as shown, there are pools of silicon at every fiber-rich ply boundary, indicating that the adhesion was poor and the preforms delaminated in the 700° C. bake step of the panel process.

Example 1

Figure 16:
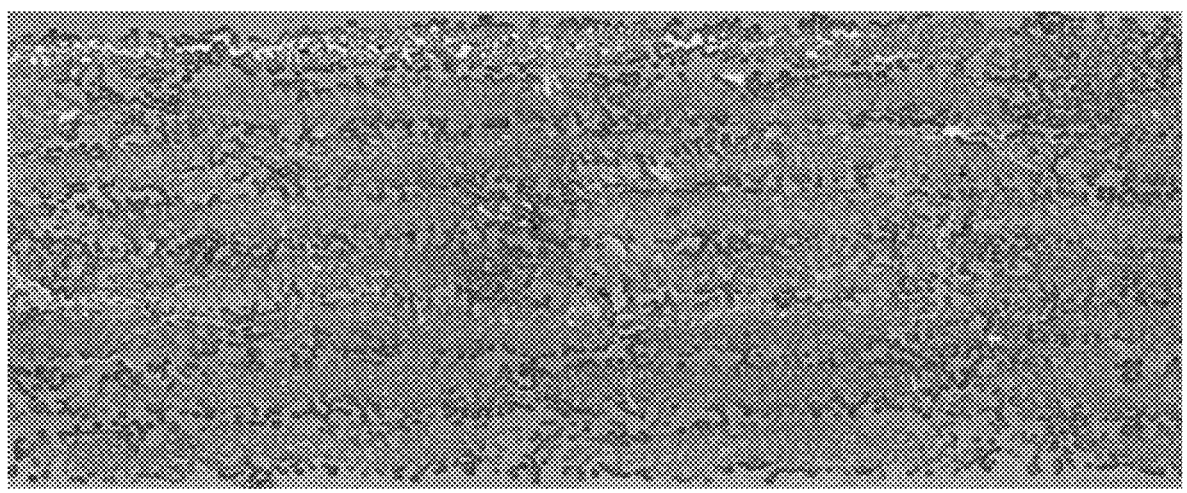
FIG. 16 provides a cross sectional view of a prepreg tape manufactured in accordance with exemplary embodiments of the present disclosure.

A prepreg tape was manufactured in accordance with one embodiment of the present disclosure as follows. Matrix material of about 0.0005 inches thick was tape-cast with a doctor-blade on a silicone-coated polyester carrier film and then allowed dried. The casted matrix film was then wrapped on a winding drum. A fiber tow wetted with a solvent was wound on the drum at about 0.045-inch spacing at about 33 ft/min at a tension of about 200 grams to form a wet prepreg tape. After drying the prepreg tape for a predetermined time, the prepreg tape was cut off the drum. Additional matrix material having a slurry composition was then cast on the prepreg tape with another doctor blade. After drying for a predetermined time, the prepreg tape and additional matrix material was compacted as described above. FIG. 16 provides a panel 410 made from a plurality of prepreg tapes formed as described in Example 1. As depicted in FIG. 16, the prepreg tapes have uniform distribution of fibers, no clear regions of matrix only, and minimal silicon pools, which indicates good adhesion.

Example 2

Figure 17:
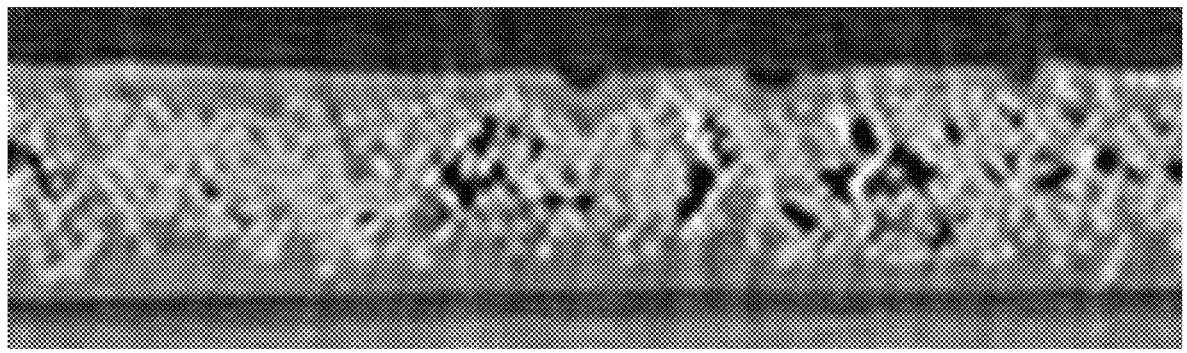
FIG. 17 provides a cross sectional view of another prepreg tape manufactured in accordance with exemplary embodiments of the present disclosure.
Figure 18:
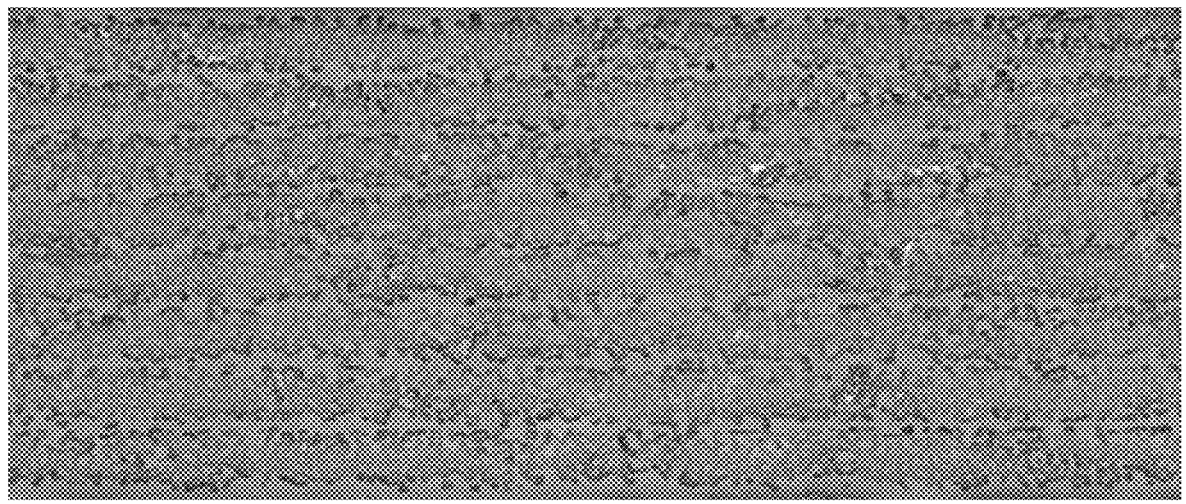
FIG. 18 provides a cross sectional view of a panel of prepreg tapes manufactured in accordance with exemplary embodiments of the present disclosure.

A Prepreg tape was manufactured in accordance with another embodiment of the present disclosure as follows. Matrix of about 0.002 inches thick was tape-cast with a doctor-blade on a silicone-coated polyester carrier film and allowed to dry for a predetermined time. The casted matrix film was then wrapped on a winding drum. Thereafter, a fiber tow wetted and impregnated with matrix slurry and passed through an orifice of diameter of 0.026 inches was wound on the drum with the matrix film wrapped thereon at about 0.045-inch spacing at about 33 ft/min at a tension of about 200 grams to form a wet prepreg. During the winding process, the fiber tows were compacted with a rubber-covered roller at force of about 5-10 lbs/in. After drying the prepreg tape for a predetermined time, the prepreg tape was cut off the drum and compacted as described above. FIG. 17 provides a prepreg tape 420 manufactured in accordance with the process described in Example 2. As shown, the prepreg tape 420 has thin layers of matrix on both sides (i.e., both the drum side and the top side) and fibers well-distributed therebetween. FIG. 18 provides a panel 422 made from a plurality of prepreg tapes formed in accordance with the process of Example 2, such as e.g., the prepreg tape 422 of FIG. 17. As depicted in FIG. 18, the panel 412 has improved distribution of fibers compared to the prior art panel of FIG. 15, and has minimal silicon pools indicating good adhesion.

Example 3

Figure 19:
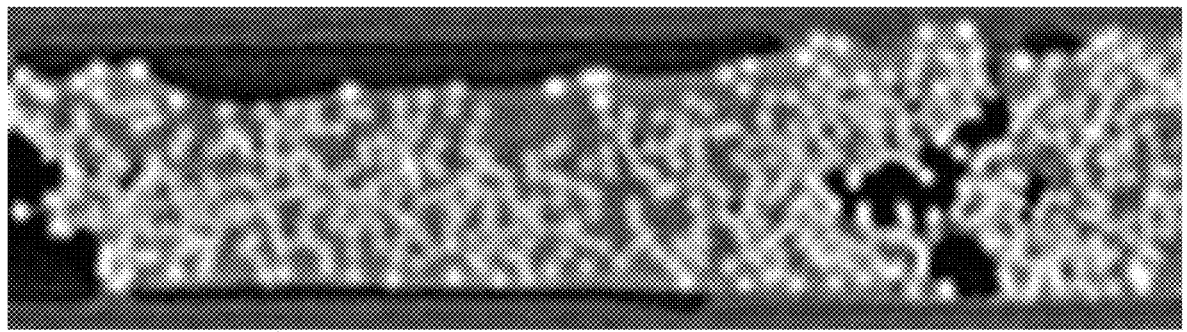
FIG. 19 provides a cross sectional view of yet another prepreg tape manufactured in accordance with exemplary embodiments of the present disclosure.
Figure 20:
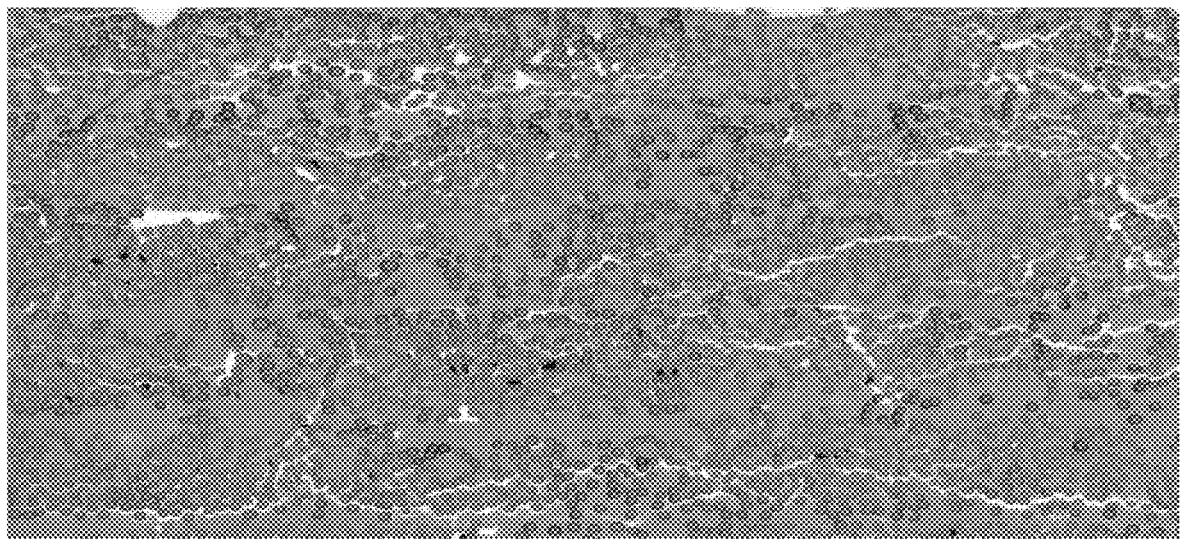
FIG. 20 provides a cross sectional view of another panel of prepreg tapes manufactured in accordance with exemplary embodiments of the present disclosure.

A prepreg tape was manufactured in accordance with one embodiment of the present disclosure as follows. Matrix of about 0.004 inches thick was tape-cast with a doctor-blade on a silicone-coated polyester carrier film and allowed to dry for a predetermined time. The casted matrix film was then wrapped on a winding drum and wet with a solvent such that the matrix material had a predetermined viscosity. Then, a fiber tow wetted with a solvent was wound on the wetted matrix material wrapped on the drum at about 0.045-inch spacing at about 165 ft/min at a tension of about 200 grams to form a wet prepreg. During the winding process, the fiber tows were compacted with a rubber-covered roller at force of about 5-10 lbs/in. After drying for a predetermined time, the prepreg tape was cut off the drum and compacted as described above. FIG. 19 provides a prepreg tape 430 manufactured in accordance with the process described in Example 3. As shown in the depicted embodiment of FIG. 19, the fibers are well-distributed throughout the thickness of the prepreg tape 430, as is the matrix. FIG. 20 provides a panel 432 made from a plurality of prepreg tapes formed in accordance with the process of Example 3, such as e.g., the prepreg tape 430 of FIG. 19. As shown in FIG. 20, the prepreg tapes of the panel 432 have improved distribution of fibers compared to the prior art panel 404 of FIG. 15. As shown, the interfaces between layers are not visible indicating good adhesion, and there are no layers of pure matrix separating fiber-rich layers.

Although the systems and methods described herein are explained in the context of manufacturing prepreg tapes for CMC articles, the disclosure disclosed herein may be applied to other types of composite articles as well.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for manufacturing a prepreg tape, the method comprising:
    winding a fiber tow comprised of a plurality of fibers about a drum so that the fiber tow penetrates into a matrix material of a matrix film disposed on the drum and so that the matrix material impregnates the fiber tow to form the prepreg tape, wherein during winding, the matrix material has a predetermined viscosity.

2. The method of claim 1, further comprising:
    casting the matrix material on a carrier film to form the matrix film; and
    drying the matrix material of the matrix film for a predetermined time.

3. The method of claim 2, wherein during casting, the matrix material is cast on the carrier film while on the drum.

4. The method of claim 2, wherein during drying, the matrix material is dried to the predetermined viscosity.

5. The method of claim 1, wherein the method further comprises:
    wetting the matrix material of the matrix film to the predetermined viscosity with a solvent.

6. The method of claim 1, further comprising:
    drying the prepreg tape for a predetermined time.

7. The method of claim 6, further comprising:
    compacting the prepreg tape.

8. The method of claim 6, further comprising:
    casting a second matrix material on a cover film to form a cover film laminate;
    covering the prepreg tape with the cover film laminate to form a prepreg laminate; and
    compacting the prepreg laminate.

9. The method of claim 8, wherein prior to covering, the method further comprises:
    drying the second matrix material of the cover film laminate for a predetermined time; and
    wetting the second matrix material of the cover film laminate.

10. The method of claim 1, further comprises:
    covering the prepreg tape with a cover film to form a prepreg laminate; and
    compacting the prepreg laminate.

11. The method of claim 1, further comprising:
    casting a second matrix material on the matrix material of the prepreg tape;
    drying the second matrix material for a predetermined time;
    covering the prepreg tape with a cover film to form a prepreg laminate; and
    compacting the prepreg laminate.

12. The method of claim 1, wherein prior to winding the fiber tow on the drum, the method further comprises:
    wetting the fiber tow.

13. The method of claim 12, wherein the fiber tow is wet with a solvent.

14. The method of claim 12, wherein wetting the fiber tow comprises impregnating the fiber tow with a slurry comprised of one or more solvents and an organic binder and at least one of a ceramic precursor and a ceramic powder.

15. The method of claim 1, wherein during winding, the method further comprises:
    compacting the fiber tow into the matrix material of the matrix film.

16. The method of claim 1, wherein the predetermined viscosity of the matrix material of the matrix film is high enough to prevent the plurality of fibers from bunching on the drum during winding and low enough to allow the matrix material to penetrate about each of the plurality of fibers of the fiber tow.

17. A method for manufacturing a prepreg tape, the method comprising: casting a matrix material on a carrier film to form a matrix film;

drying the matrix material of the matrix film for a predetermined time;
wetting the matrix material of the matrix film to a predetermined viscosity with a solvent;
winding a fiber tow comprised of a plurality of fibers about a drum so that the fiber tow penetrates into the matrix material and the matrix material impregnates the fiber tow to form the prepreg tape, wherein the matrix material is disposed on the drum;
drying the prepreg tape for a predetermined time;
covering the prepreg tape with a cover film to form a prepreg laminate; and
compacting the prepreg laminate.

18. The method of claim 17, wherein prior to or during winding, the method further comprises:
applying heat to the matrix film to soften the matrix material of the matrix film.

* * * * *